(12) United States Patent
Ichikawa

(10) Patent No.: US 10,960,770 B2
(45) Date of Patent: Mar. 30, 2021

(54) VEHICLE

(71) Applicant: TOYOTA JIDOSHA KABUSHIKI KAISHA, Aichi-ken (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/130,687

(22) Filed: Sep. 13, 2018

(65) Prior Publication Data
US 2019/0031033 A1    Jan. 31, 2019

Related U.S. Application Data

(63) Continuation of application No. 14/395,732, filed as application No. PCT/JP2012/061829 on May 9, 2012, now abandoned.

(51) Int. Cl.
*B60L 11/18* (2006.01)
*H02J 50/12* (2016.01)
(Continued)

(52) U.S. Cl.
CPC .......... *B60L 11/182* (2013.01); *B60L 53/122* (2019.02); *B60L 53/126* (2019.02); *H01F 38/14* (2013.01); *H02J 5/005* (2013.01); *H02J 7/0042* (2013.01); *H02J 7/025* (2013.01); *H02J 50/12* (2016.02); *H04B 5/0037* (2013.01); *H04B 5/0081* (2013.01); *Y02T 10/70* (2013.01);
(Continued)

(58) Field of Classification Search
CPC ...... B60L 53/12; B60L 11/182; B60L 53/126; B60L 53/122; H02J 50/12; H02J 5/005; H02J 7/0042; H02J 7/025; H01F 38/14; H04B 5/0037; H04B 5/0081; Y02T 10/7005; Y02T 10/7072; Y02T 90/122; Y02T 90/125; Y02T 90/14
USPC .................................................. 180/2.1, 54.1
See application file for complete search history.

(56) References Cited

U.S. PATENT DOCUMENTS 4,106,789 A    8/1978 High
4,284,218 A    8/1981 Gillis
(Continued)

FOREIGN PATENT DOCUMENTS

AU    2006269374 B2    1/2007
AU    2006269374 C1    1/2007
(Continued)

OTHER PUBLICATIONS

Dr. Aviva Brecher et al., "Review and Evaluation of Wireless Power Transfer (WPT) for Electric Transit Applications," FTA Research; FTA Report No. 0060 (Aug. 2014) 61 pages total; URL: http://ntl.bts.gov/lib/52000/52500/52580/FTA_Report_No._0060.pdf.
(Continued)

*Primary Examiner* — John D Walters
(74) *Attorney, Agent, or Firm* — Sughrue Mion, PLLC

(57) ABSTRACT

A vehicle includes a coil (22) receiving electric power contactlessly from a power transmission unit (56) provided externally; and a bottom surface. The coil (22) is formed to surround a winding axis (O1) of the coil (22). When the winding axis (O1) and the bottom surface (76) are viewed from above the vehicle, the coil (22) is disposed such that the winding axis (O1) located to fall within the bottom surface (76) is shorter in length than the vehicle in a front-rear direction.

2 Claims, 27 Drawing Sheets

(51) Int. Cl.
　　　*H01F 38/14*　　　(2006.01)
　　　*H02J 5/00*　　　(2016.01)
　　　*H02J 7/02*　　　(2016.01)
　　　*B60L 53/122*　　(2019.01)
　　　*B60L 53/126*　　(2019.01)
　　　*H02J 7/00*　　　(2006.01)
　　　*H04B 5/00*　　　(2006.01)

(52) U.S. Cl.
　　　CPC ............ *Y02T 10/7072* (2013.01); *Y02T 90/12* (2013.01); *Y02T 90/14* (2013.01)

(56) References Cited

U.S. PATENT DOCUMENTS

| | | |
|---|---|---|
| 5,821,728 A | 10/1998 | Schwind |
| 5,821,731 A * | 10/1998 | Kuki .................. B60L 53/36 320/108 |
| 5,898,579 A | 4/1999 | Boys |
| 6,176,433 B1 | 1/2001 | Uesaka |
| 6,906,495 B2 | 6/2005 | Cheng |
| 7,741,734 B2 | 6/2010 | Joannopoulos et al. |
| 7,880,337 B2 | 2/2011 | Farkas |
| 8,122,984 B2 * | 2/2012 | Miwa .................. B60L 50/16 180/65.27 |
| 8,292,052 B2 | 10/2012 | Bohori |
| 8,508,184 B2 | 8/2013 | Sakakibara |
| 8,610,399 B2 | 12/2013 | Takada |
| 8,624,548 B2 | 1/2014 | Yamazaki |
| 8,716,900 B2 | 5/2014 | Kanno |
| 8,807,308 B2 | 8/2014 | Suh |
| 8,836,170 B2 | 9/2014 | Shionoiri |
| 8,901,777 B2 | 12/2014 | Kamata |
| 8,933,594 B2 | 1/2015 | Kurs |
| 8,937,454 B2 * | 1/2015 | Baarman ............... B60L 53/36 320/108 |
| 8,946,938 B2 | 2/2015 | Kesler |
| 8,970,168 B2 | 3/2015 | Kohlschmidt |
| 9,050,900 B2 | 6/2015 | Kai |
| 9,067,497 B2 | 6/2015 | Ichikawa |
| 9,071,061 B2 | 6/2015 | Boys |
| 9,118,203 B2 | 8/2015 | Davis |
| 9,233,619 B2 * | 1/2016 | Ono ..................... B60L 53/14 |
| 2007/0131505 A1 | 6/2007 | Kim |
| 2007/0222542 A1 | 9/2007 | Joannopoulos et al. |
| 2008/0129246 A1 | 6/2008 | Morita et al. |
| 2008/0265684 A1 | 10/2008 | Farkas |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0025127 A1 | 2/2010 | Oyobe |
| 2010/0065352 A1 | 3/2010 | Ichikawa |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0130096 A1 | 5/2010 | Baarman |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1 | 9/2010 | Oyobe |
| 2010/0231053 A1 | 9/2010 | Karalis et al. |
| 2010/0231340 A1 | 9/2010 | Fiorello |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall |
| 2010/0253152 A1 | 10/2010 | Karalis et al. |
| 2010/0264745 A1 | 10/2010 | Karalis et al. |
| 2010/0264747 A1 | 10/2010 | Hall |
| 2011/0049978 A1 | 3/2011 | Sasaki |
| 2011/0101788 A1 | 5/2011 | Sun |
| 2011/0109263 A1 | 5/2011 | Sakoda et al. |
| 2011/0163542 A1 | 7/2011 | Farkas |
| 2011/0259694 A1 | 10/2011 | Matsumura |
| 2011/0273025 A1 | 11/2011 | Amano et al. |
| 2011/0309790 A1 | 12/2011 | Sasaki |
| 2011/0315496 A1 | 12/2011 | Bohori |
| 2012/0025602 A1 * | 2/2012 | Boys .................. H04B 5/0037 307/9.1 |
| 2012/0043931 A1 | 2/2012 | Terao et al. |
| 2012/0055751 A1 | 3/2012 | Vollenwyder |
| 2012/0062039 A1 | 3/2012 | Kamata |
| 2012/0062345 A1 | 3/2012 | Kurs |
| 2012/0091820 A1 | 4/2012 | Campanella |
| 2012/0098330 A1 | 4/2012 | Ichikawa |
| 2012/0098350 A1 | 4/2012 | Campanella |
| 2012/0153732 A1 | 6/2012 | Kurs |
| 2012/0161696 A1 | 6/2012 | Cook |
| 2012/0186927 A1 | 7/2012 | Suh |
| 2012/0228952 A1 | 9/2012 | Hall |
| 2012/0235502 A1 | 9/2012 | Kesler |
| 2012/0235504 A1 | 9/2012 | Kesler |
| 2012/0239117 A1 | 9/2012 | Kesler |
| 2012/0248981 A1 | 10/2012 | Karalis |
| 2012/0280804 A1 | 11/2012 | Matsumoto |
| 2012/0306439 A1 | 12/2012 | Ichikawa et al. |
| 2012/0313449 A1 | 12/2012 | Kurs |
| 2012/0318586 A1 | 12/2012 | Atarashi |
| 2013/0009462 A1 | 1/2013 | Amano |
| 2013/0009488 A1 | 1/2013 | Choe |
| 2013/0037365 A1 | 2/2013 | Ichikawa |
| 2013/0037367 A1 | 2/2013 | Aguilar |
| 2013/0038276 A1 | 2/2013 | Raedy |
| 2013/0038281 A1 | 2/2013 | Sakakibara et al. |
| 2013/0088087 A1 | 4/2013 | Yamamoto |
| 2013/0119774 A1 | 5/2013 | Ichikawa |
| 2013/0175875 A1 | 7/2013 | Kurs |
| 2013/0249303 A1 | 9/2013 | Keeling |
| 2013/0270921 A1 | 10/2013 | Boys |
| 2013/0300359 A1 | 11/2013 | Nakamura |
| 2013/0313913 A1 | 11/2013 | Ichikawa |
| 2013/0334891 A1 | 12/2013 | Komma |
| 2013/0334892 A1 | 12/2013 | Hall |
| 2013/0335018 A1 | 12/2013 | Ichikawa |
| 2014/0008973 A1 | 1/2014 | Elias |
| 2014/0035520 A1 | 2/2014 | Nakayama |
| 2014/0035526 A1 | 2/2014 | Tripathi |
| 2014/0049118 A1 | 2/2014 | Karalis |
| 2014/0054973 A1 | 2/2014 | Asanuma |
| 2014/0055089 A1 | 2/2014 | Ichikawa |
| 2014/0062181 A1 | 3/2014 | Bohori |
| 2014/0077760 A1 | 3/2014 | Ichikawa |
| 2014/0084697 A1 | 3/2014 | Yasuda |
| 2014/0084863 A1 | 3/2014 | Nakamura |
| 2014/0097671 A1 | 4/2014 | Nakamura |
| 2014/0111022 A1 | 4/2014 | Yamakawa |
| 2014/0111151 A1 | 4/2014 | Keeling |
| 2014/0125144 A1 | 5/2014 | Nakamura |
| 2014/0132212 A1 | 5/2014 | Ichikawa |
| 2014/0145514 A1 | 5/2014 | Konno |
| 2014/0159501 A1 | 6/2014 | Kanno |
| 2014/0159652 A1 | 6/2014 | Hall |
| 2014/0175898 A1 | 6/2014 | Kurs |
| 2014/0183966 A1 | 7/2014 | Suzuki |
| 2014/0191586 A1 | 7/2014 | Ichikawa |
| 2014/0197694 A1 | 7/2014 | Asanuma |

(56) References Cited

U.S. PATENT DOCUMENTS

| | | |
|---|---|---|
| 2014/0198544 A1 | 7/2014 | Tanaka |
| 2014/0203768 A1 | 7/2014 | Andic |
| 2014/0225449 A1 | 8/2014 | Kurs |
| 2014/0225563 A1 | 8/2014 | Ichikawa |
| 2014/0232197 A1 | 8/2014 | Keeling |
| 2014/0232331 A1 | 8/2014 | Stamenic |
| 2014/0232336 A1 | 8/2014 | Kepka |
| 2014/0252869 A1 | 9/2014 | Kamiura |
| 2014/0257614 A1 | 9/2014 | Niizuma |
| 2014/0284159 A1 | 9/2014 | Boys |
| 2014/0285029 A1 | 9/2014 | Ichikawa |
| 2014/0285030 A1 | 9/2014 | Nakamura |
| 2014/0292264 A1 | 10/2014 | Boys et al. |
| 2014/0292268 A1 | 10/2014 | Griepentrog |
| 2014/0292270 A1 | 10/2014 | Ichikawa |
| 2014/0300198 A1 | 10/2014 | Wakabayashi |
| 2014/0305722 A1 | 10/2014 | Ichikawa |
| 2014/0312706 A1 | 10/2014 | Fiorello |
| 2014/0320078 A1 | 10/2014 | Nakamura |
| 2014/0320090 A1 | 10/2014 | Keeling |
| 2014/0327391 A1 | 11/2014 | Niederhauser |
| 2014/0327394 A1 | 11/2014 | Asselin |
| 2014/0333128 A1 | 11/2014 | Ichikawa |
| 2014/0333150 A1 | 11/2014 | Iwawaki |
| 2014/0333256 A1 | 11/2014 | Widmer |
| 2014/0340027 A1 | 11/2014 | Keeling |
| 2014/0340035 A1 | 11/2014 | Maekawa |
| 2014/0354041 A1 | 12/2014 | Yoshi |
| 2014/0354068 A1 | 12/2014 | Horiuchi |
| 2014/0354223 A1 | 12/2014 | Lee |
| 2015/0001954 A1 | 1/2015 | Tamaki |
| 2015/0015419 A1 | 1/2015 | Halker |
| 2015/0028687 A1 | 1/2015 | Ichikawa |
| 2015/0042168 A1 | 2/2015 | Widmer |
| 2015/0042271 A1 | 2/2015 | Nakagawa |
| 2015/0048688 A1 | 2/2015 | Yamakawa |
| 2015/0054350 A1 | 2/2015 | Covic |
| 2015/0054456 A1 | 2/2015 | Yamakawa |
| 2015/0061580 A1 | 3/2015 | Yamakawa |
| 2015/0061582 A1 | 3/2015 | Tatsuta |
| 2015/0061583 A1 | 3/2015 | Nakamura |
| 2015/0061593 A1 | 3/2015 | Wechlin |
| 2015/0069833 A1 | 3/2015 | Yuasa |
| 2015/0069964 A1 | 3/2015 | Kamikihara |
| 2015/0073642 A1 | 3/2015 | Widmer |
| 2015/0077046 A1 | 3/2015 | Huang |
| 2015/0084405 A1 | 3/2015 | Koizumi |
| 2015/0090552 A1 | 4/2015 | Desire |
| 2015/0091511 A1 | 4/2015 | Ichikawa |
| 2015/0091519 A1 | 4/2015 | Komma et al. |
| 2015/0091521 A1 | 4/2015 | Blum |
| 2015/0097444 A1 | 4/2015 | Kamiura |
| 2015/0102664 A1 | 4/2015 | Tatsuta |
| 2015/0102684 A1 | 4/2015 | Tanaka |
| 2015/0107914 A1 | 4/2015 | Zhao |
| 2015/0115704 A1 | 4/2015 | Gorai |
| 2015/0123465 A1 | 5/2015 | Ichikawa |
| 2015/0123485 A1 | 5/2015 | Yamakawa |
| 2015/0130288 A1 | 5/2015 | Ichikawa |
| 2015/0137590 A1 | 5/2015 | Ichikawa |
| 2015/0145339 A1 | 5/2015 | Chiyo |
| 2015/0145340 A1 | 5/2015 | Chiyo |
| 2015/0145341 A1 | 5/2015 | Chiyo |
| 2015/0145342 A1 | 5/2015 | Chiyo |
| 2015/0145343 A1 | 5/2015 | Chiyo |
| 2015/0170833 A1 | 6/2015 | Widmer |
| 2015/0236519 A1 | 8/2015 | Nakano |
| 2015/0255205 A1 | 9/2015 | Islinger |
| 2015/0280445 A1 | 10/2015 | Yamakawa et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 7/2006 |
| CA | 2 682 284 A1 | 6/2007 |
| CN | 101258658 A | 9/2008 |
| CN | 101682216 A | 3/2010 |
| CN | 101860089 A | 10/2010 |
| CN | 102055250 A | 5/2011 |
| CN | 102216110 A | 10/2011 |
| DE | 102009013694 A1 | 9/2010 |
| DE | 202009009691 U1 | 12/2010 |
| EP | 1 902 505 A2 | 3/2008 |
| EP | 2 130 287 A | 12/2009 |
| IN | 735/DELNP/2008 | 5/2008 |
| IN | 6195/DELNP/2009 | 7/2009 |
| JP | 467701 A | 3/1992 |
| JP | 2009501510 T | 1/2009 |
| JP | 2010-172084 A | 8/2010 |
| JP | 2010-183812 A | 8/2010 |
| JP | 2010268664 A | 11/2010 |
| JP | 2011-049230 A | 3/2011 |
| JP | 2011-50127 A | 3/2011 |
| JP | 2011-097671 A | 5/2011 |
| JP | 2011193671 A | 9/2011 |
| JP | 2011-234496 A | 11/2011 |
| JP | 2012065537 A | 3/2012 |
| KR | 20080031398 A | 4/2008 |
| KR | 20100015954 A | 2/2010 |
| KR | 1020110053490 A | 5/2011 |
| WO | 2007/008646 A2 | 1/2007 |
| WO | 2008111547 A1 | 9/2008 |
| WO | 2008/118178 A1 | 10/2008 |
| WO | 2010/058477 A1 | 5/2010 |
| WO | 2010131348 A1 | 11/2010 |
| WO | 2011108403 A1 | 9/2011 |
| WO | 2011135424 A2 | 11/2011 |

OTHER PUBLICATIONS

International Search Report for PCT/JP2012/061829 dated Aug. 14, 2012.

Jesse Schneider, "SAE J2954 Overview and Path Forward," SAE International; (2012) URL: http://www.sae.org/smartgrid/sae-j2954-status_1-2012.pdf; 22 pages total.

* cited by examiner

FIG.9
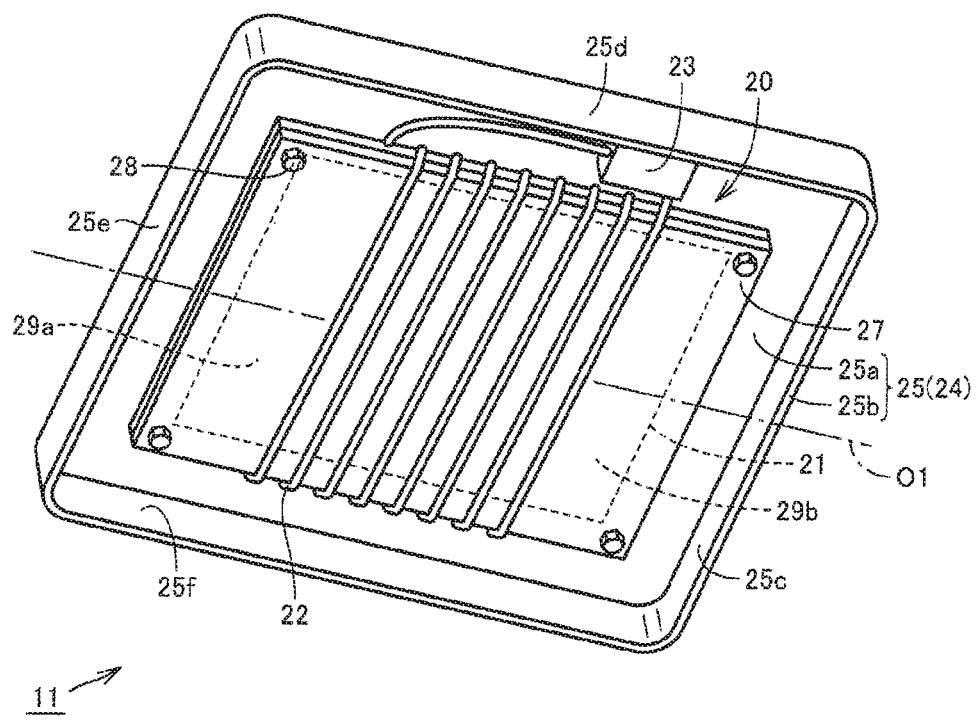
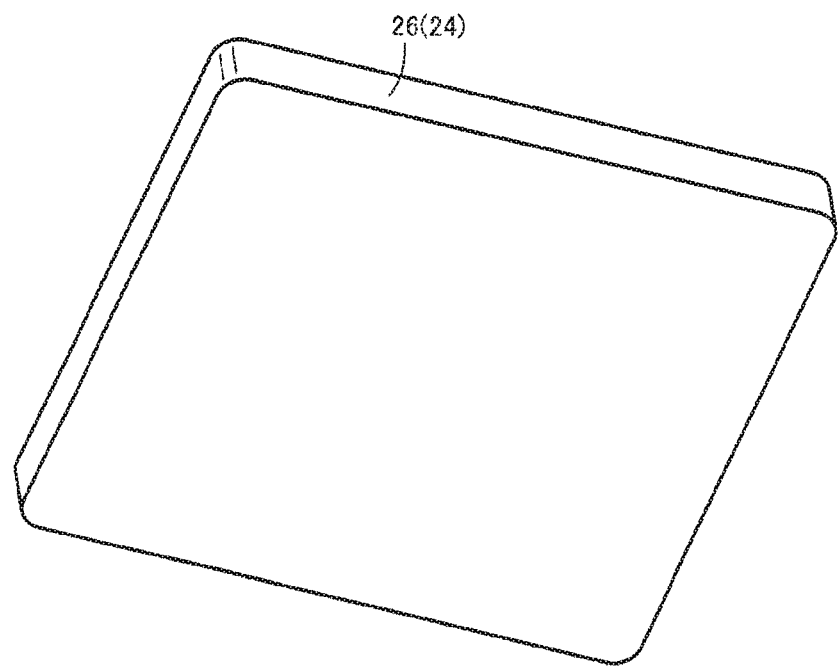

VEHICLE

CROSS-REFERENCE TO RELATED APPLICATIONS

This application is a continuation of U.S. patent application Ser. No. 14/395,732, filed on Oct. 20, 2014, which claims the benefit of PCT Application No. PCT/JP2012/061829, filed on May 9, 2012, the disclosures of which are incorporated herein in their entirety by reference.

TECHNICAL FIELD

The present invention relates to a vehicle.

BACKGROUND ART

In recent years, due to concerns with environment, attention has been drawn to a hybrid vehicle, an electric vehicle, and the like, each of which drives driving wheels using electric power from a battery or the like.

Particularly drawing attention in recent years is wireless charging, by which such a battery included in an electrically powered vehicle can be charged contactlessly without using a plug or the like.

For example, a contactless power supply device described in Japanese Patent Laying-Open No. 2011-97671 includes a secondary coil mounted in a vehicle, and a primary coil provided externally to the vehicle and connected to a high-frequency power supply. When viewed in plan, the primary coil is formed in a horizontally long shape, and disposed such that its longitudinal direction is orthogonal to the traveling direction of the vehicle. When viewed in plan, the secondary coil is formed in a vertically long shape, and disposed such that its longitudinal direction corresponds to the traveling direction of the vehicle.

A contactless power feeding device described in Japanese Patent Laying-Open No. 2010-172084 includes a primary side coil wound around a primary side core, and a secondary side coil wound around a secondary side core.

The secondary side core and the secondary side coil are mounted on the rear end portion side of the vehicle. The secondary side core is formed of a plurality of plate-shaped cores arranged in the width direction of the vehicle.

A contactless power feeding device described in Japanese Patent Laying-Open No. 2011-49230 includes a power feeding unit provided on the ground side, a power reception unit provided on the vehicle side, and a secondary-side shield plate provided in the vehicle. The power reception unit includes a ferrite plate and a coil wound around this ferrite plate. The power feeding unit also includes a ferrite plate and a coil wound around this ferrite plate.

The ferrite plate of the power reception unit and the ferrite plate of the power feeding unit have the same shape. Each ferrite plate is formed to be longer in the width direction of the vehicle than in the front-rear direction of the vehicle.

CITATION LIST

Patent Document

PTD 1: Japanese Patent Laying-Open No. 2011-97671
PTD 2: Japanese Patent Laying-Open No. 2010-172084
PTD 3: Japanese Patent Laying-Open No. 2011-49230

SUMMARY OF INVENTION

Technical Problem

Generally, a vehicle is equipped with various types of in-vehicle devices. Accordingly, depending on the manner in which the coil is mounted in the vehicle, the in-vehicle devices may be significantly affected by an electromagnetic field formed around the coil during transfer of electric power.

The present invention has been made in light of the above-described problems. An object of the present invention is to provide a vehicle including an in-vehicle device that is suppressed from being significantly affected by an electromagnetic field formed around a coil mounted in the vehicle during transfer of electric power.

Solution to Problem

A vehicle according to the present invention includes: a coil receiving electric power contactlessly from a power transmission unit provided externally; and a bottom surface. The coil is formed to surround a winding axis of the coil. When the winding axis and the bottom surface are viewed from above the vehicle, the coil is disposed such that the winding axis located to fall within the bottom surface is shorter in length than the vehicle in a front-rear direction.

Preferably, the coil is disposed such that the winding axis extends in a width direction of the vehicle.

Preferably, the vehicle further includes a door that opens/closes an opening of a passenger compartment housing a passenger. The coil is provided on at least one of a front side and a rear side relative to the door in a traveling direction.

Preferably, the vehicle further includes a first wheel and a second wheel arranged in a width direction of the vehicle. The coil is disposed such that the winding axis passes through the first wheel and the second wheel.

Preferably, the vehicle further includes a connection portion to which a supply unit that supplies energy is connected. The connection portion is provided, on a side surface of the vehicle, in at least one of a portion located above the first wheel and a portion located above the second wheel. Preferably, the coil is provided on a side of the bottom surface.

Preferably, when the coil is viewed from above the vehicle, a central line passing through a central portion of the vehicle in a width direction and extending in the front-rear direction of the vehicle passes through the coil.

Preferably, the coil includes a first coil and a second coil. The first coil and the second coil are arranged at a distance from each other in a direction in which the winding axis extends.

Preferably, the coil includes a third coil formed to surround a first winding axis, a fourth coil formed to surround the first winding axis and disposed at a distance from the third coil, a fifth coil formed to surround a second winding axis, and a sixth coil formed to surround the second winding axis and disposed at a distance from the fifth coil. When the first winding axis, the second winding axis and the bottom surface are viewed from above the vehicle, the first winding axis located to fall within the bottom surface and the second winding axis located to fall within the bottom surface each are shorter in length than the vehicle in the front-rear direction.

Preferably, the vehicle includes a power reception unit including the coil. A difference between a natural frequency of the power transmission unit and a natural frequency of the power reception unit is equal to or less than 10% of the natural frequency of the power reception unit.

Preferably, the vehicle includes a power reception unit including the coil. A coupling coefficient between the power reception unit and the power transmission unit is equal to or less than 0.1.

Preferably, the vehicle includes a power reception unit including the coil. The power reception unit receives electric power from the power transmission unit through at least one of a magnetic field and an electric field, the magnetic field being formed between the power reception unit and the power transmission unit and oscillating at a specific frequency, the electric field being formed between the power reception unit and the power transmission unit and oscillating at the specific frequency.

Preferably, the vehicle includes a first coil and a second coil each receiving electric power contactlessly from a power transmission unit provided externally. The first coil is formed to surround a first winding axis extending in a vertical direction. The second coil is formed to surround a second winding axis extending in the vertical direction. The first coil and the second coil are arranged in a width direction of the vehicle.

Advantageous Effects of Invention

According to the vehicle of the present invention, in-vehicle devices can be suppressed from being significantly affected by an electromagnetic field formed around a coil mounted in the vehicle during transfer of electric power.

BRIEF DESCRIPTION OF DRAWINGS

FIG. 9 is an exploded perspective view of power reception device 11.

DESCRIPTION OF EMBODIMENTS

With reference to FIG. 1 to FIG. 43, the following describes an electrically powered vehicle according to the present invention.

First Embodiment

Figure 1:
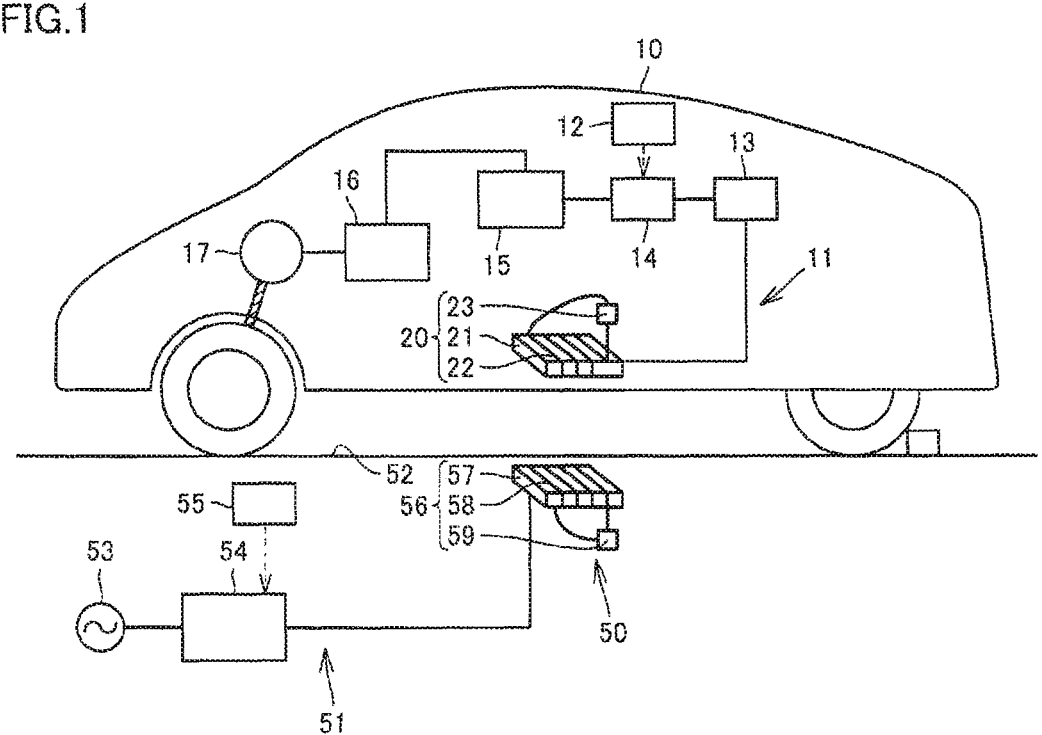
FIG. 1 is a schematic view schematically showing a power reception device, a power transmission device, and a power transfer system according to the present embodiment.

FIG. 1 is a schematic view schematically showing a power reception device, a power transmission device and a power transfer system according to the present embodiment.

The power transfer system according to the first embodiment includes: an electrically powered vehicle 10 including a power reception device 11; and an external power feeding device 51 including a power transmission device 50. Power reception device 11 of electrically powered vehicle 10 receives electric power mainly from power transmission device 50 when parked in a predetermined position of a parking space 52 provided with power transmission device 50.

Parking space 52 is provided with a sprag as well as lines indicating a parking position and a parking range such that electrically powered vehicle 10 is parked at the predetermined position.

External power feeding device 51 includes: a high-frequency power driver 54 connected to an AC power supply 53; a control unit 55 that controls driving of high-frequency power driver 54 or the like; and power transmission device 50 connected to this high-frequency power driver 54. Power transmission device 50 includes a power transmission unit 56. Power transmission unit 56 includes: a ferrite core 57; a first coil (resonance coil) 58 wound around ferrite core 57; and a capacitor 59 connected to this first coil 58. It is to be noted that capacitor 59 is not an essential configuration. First coil 58 is connected to high-frequency power driver 54.

Power transmission unit 56 includes an electric circuit formed by inductance of first coil 58, stray capacitance of first coil 58, and capacitance of capacitor 59.

In FIG. 1, electrically powered vehicle 10 includes: power reception device 11; a rectifier 13 connected to power reception device 11; a DC/DC converter 14 connected to rectifier 13; a battery 15 connected to DC/DC converter 14; a power control unit (PCU) 16; a motor unit 17 connected to power control unit 16; and a vehicle ECU (Electronic Control Unit) 12 that controls driving of DC/DC converter 14, power control unit 16, or the like. It is to be noted that electrically powered vehicle 10 according to the present embodiment is a hybrid vehicle including an engine not shown in the figures, but includes a fuel cell vehicle as long as it is a vehicle driven by a motor.

Rectifier 13, which is connected to power reception device 11, converts alternating current supplied from power reception device 11 into direct current, and supplies it to DC/DC converter 14.

DC/DC converter 14 adjusts the voltage of the direct current supplied from rectifier 13, and supplies it to battery 15. It is to be noted that DC/DC converter 14 is not an essential configuration and may be omitted. In such a case, DC/DC converter 14 can be replaced with a matching device provided between power transmission device 50 and high-frequency power driver 54 to match the impedance with external power feeding device 51.

Power control unit 16 includes a converter connected to battery 15 and an inverter connected to this converter, and the converter adjusts (boosts) the direct current supplied from battery 15 and supplies it to the inverter. The inverter converts the direct current supplied from the converter into alternating current, and supplies it to motor unit 17.

For motor unit 17, a three-phase alternating current motor or the like is employed, for example. Motor unit 17 is driven using the alternating current supplied from the inverter of power control unit 16.

It is to be noted that electrically powered vehicle 10 further includes an engine or a fuel cell. Motor unit 17 includes: a motor generator that mainly functions as a power generator; and a motor generator that mainly functions as a motor.

Power reception device 11 includes a power reception unit 20. Power reception unit 20 includes: a ferrite core 21; a second coil 22 wound around the outer circumferential surface of ferrite core 21; and a capacitor 23 connected to second coil 22. Also in power reception unit 20, capacitor 23 is not an essential configuration. Second coil 22 is connected to rectifier 13. Second coil 22 has stray capacitance. Accordingly, power reception unit 20 has an electric circuit formed by inductance of second coil 22 and capacitances of second coil 22 and capacitor 23. It is to be noted that capacitor 23 is not an essential configuration and can be omitted.

Figure 2:
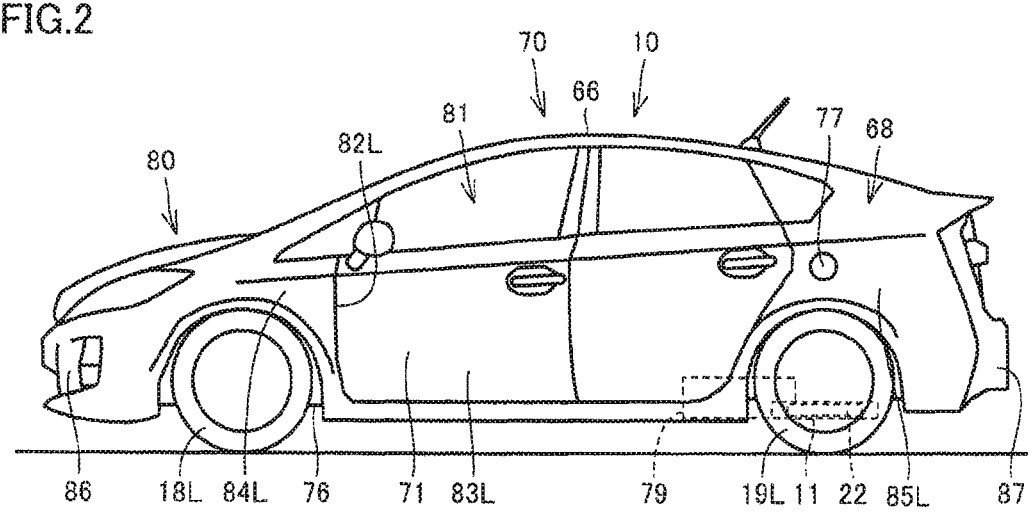
FIG. 2 is a side view showing the left side surface of an electrically powered vehicle 10.
Figure 3:
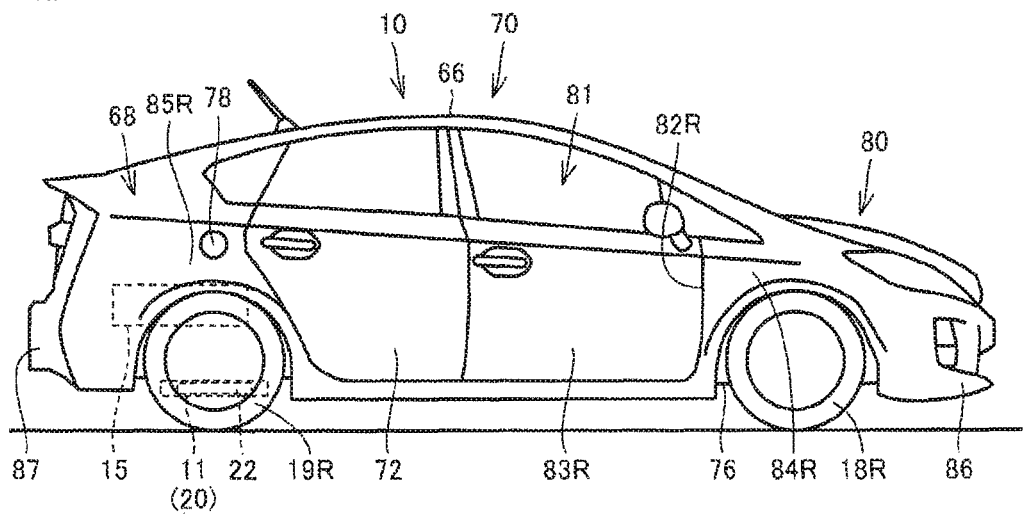
FIG. 3 is a side view showing the right side surface of electrically powered vehicle 10.
Figure 4:
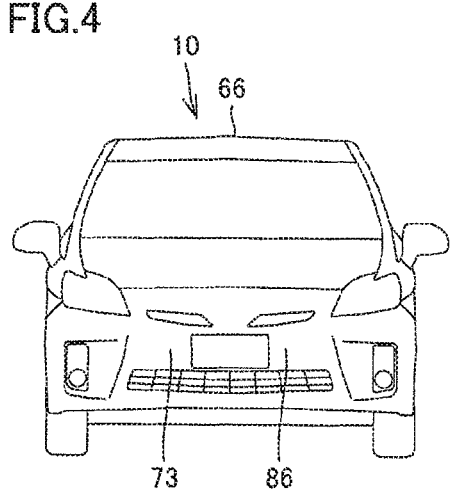
FIG. 4 is a front view of electrically powered vehicle 10.
Figure 5:
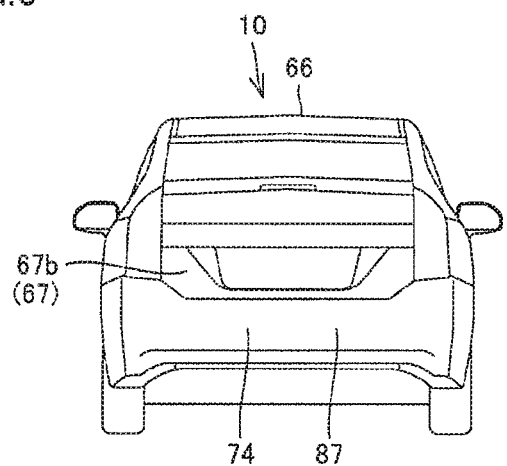
FIG. 5 is a rear view of electrically powered vehicle 10.
Figure 6:
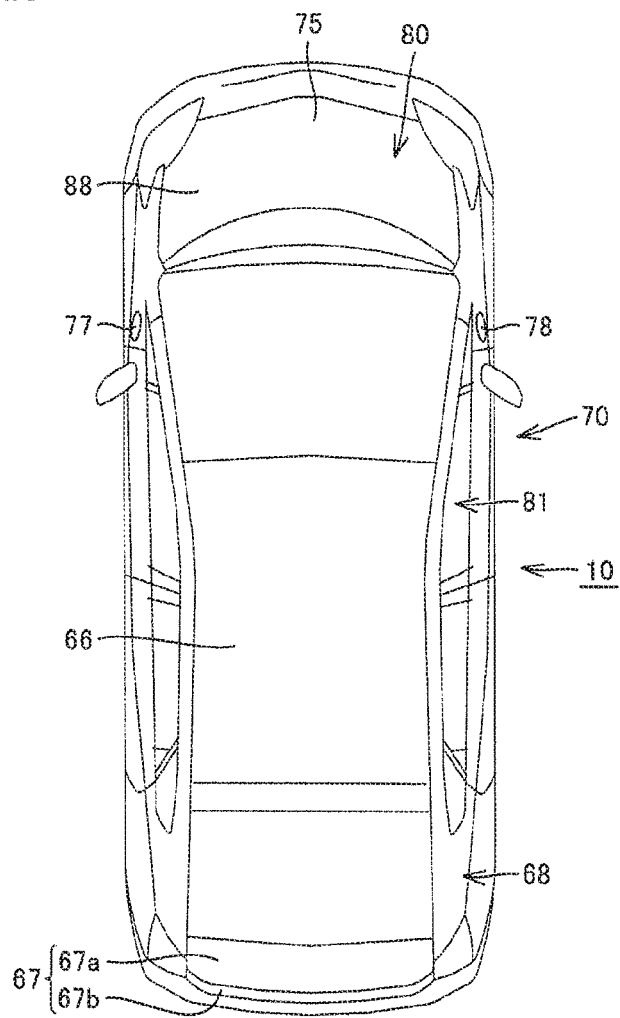
FIG. 6 is a front view of electrically powered vehicle 10.
Figure 7:
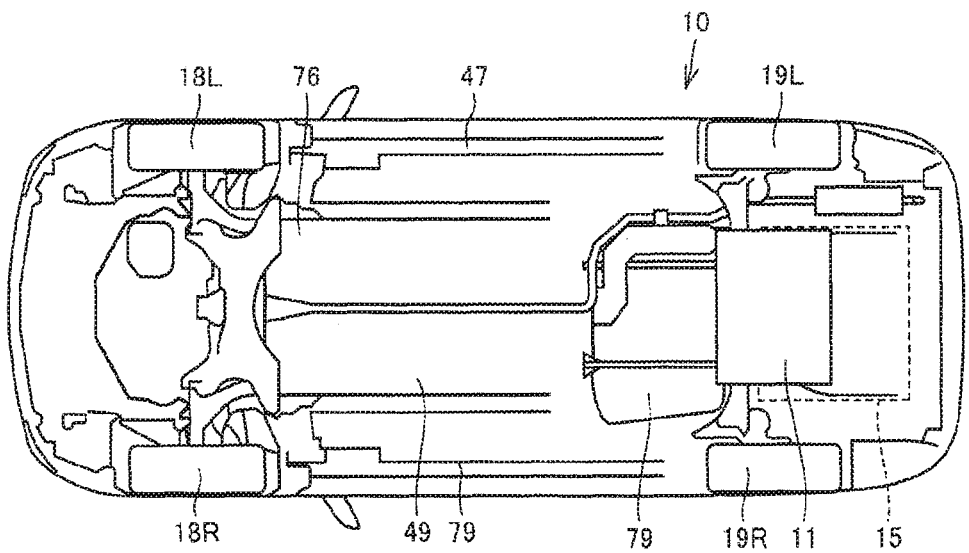
FIG. 7 is a bottom view of electrically powered vehicle 10.

FIG. 2 is a side view showing the left side surface of electrically powered vehicle 10. FIG. 3 is a side view showing the right side surface of electrically powered vehicle 10. FIG. 4 is a front view of electrically powered vehicle 10. FIG. 5 is a rear view of electrically powered vehicle 10. FIG. 6 is a plan view of electrically powered vehicle 10. FIG. 7 is a bottom view of electrically powered vehicle 10.

In FIG. 2, electrically powered vehicle 10 includes a vehicle main body 70 and wheels provided in vehicle main body 70. Formed in vehicle main body 70 are: a driving compartment 80 having motor unit 17, the engine, and the like contained therein; a passenger compartment 81 capable of containing a passenger therein and disposed at a rear side relative to driving compartment 80 in the traveling direction of electrically powered vehicle 10; and a luggage compartment 68 disposed at a rear side relative to passenger compartment 81 in the traveling direction.

In left side surface 71 of electrically powered vehicle 10, a boarding opening 82L is formed to communicate with passenger compartment 81. Vehicle main body 70 includes: a door 83L that opens/closes boarding opening 82L; a front fender 84L disposed at a front side relative to boarding opening 82L in the traveling direction; and a front bumper 86 disposed at a front side relative to front fender 84 in the traveling direction.

Vehicle main body 70 includes: a rear fender 85L disposed at a rear side relative to boarding opening 82L in the traveling direction; and a rear bumper 87 disposed at a rear side relative to rear fender 85L in the travelling direction.

In FIG. 3, in right side surface 72 of electrically powered vehicle 10, a boarding opening 82R is formed to communicate with passenger compartment 81. Vehicle main body 70 includes: a door 83R that opens/closes boarding opening 82R; a front fender 84R disposed at a front side relative to boarding opening 82R in the traveling direction; and a rear fender 85R disposed at a rear side relative to boarding opening 82R in the traveling direction. In FIG. 6, vehicle main body 70 includes: an engine roof 88 that opens/closes driving compartment 80; a roof 66 that defines the upper surface of passenger compartment 81; and a hatch 67 that opens/closes an opening formed in luggage compartment 68. Hatch 67 includes an upper surface portion 67*a* and a rear surface portion 67*b*.

Left side surface 71 of electrically powered vehicle 10 is a surface that is in the width direction of electrically powered vehicle 10 and that can be seen when electrically powered vehicle 10 is viewed from a position away from electrically powered vehicle 10 leftward as shown in FIG. 2.

Hence, left side surface 71 of electrically powered vehicle 10 is mainly defined by the side portion of front bumper 86, front fender 84L, door 83L, rear fender 85L, and the side portion of rear bumper 87.

In FIG. 3, right side surface 72 of electrically powered vehicle 10 is a surface that is in the width direction of electrically powered vehicle 10 and that can be seen when electrically powered vehicle 10 is viewed from a position away from electrically powered vehicle 10 rightward as shown in FIG. 3. Hence, right side surface 72 of electrically powered vehicle 10 is mainly defined by the side portion of front bumper 86, front fender 84R, door 83R, rear fender 85R, and the side portion of rear bumper 87. In FIG. 4, front surface 73 of electrically powered vehicle 10 is a surface that can be seen when electrically powered vehicle 10 is viewed from a position away from electrically powered vehicle 10 forwardly in the traveling direction.

Accordingly, front surface 73 of electrically powered vehicle 10 is mainly defined by the front surface portion of front bumper 86 and members provided between engine roof 88 and front bumper 86.

In FIG. 5, rear surface 74 of electrically powered vehicle 10 is a surface that can be seen when electrically powered vehicle 10 is viewed from a position away from electrically powered vehicle 10 backwardly in the traveling direction.

Accordingly, rear surface 74 of electrically powered vehicle 10 is mainly defined by the rear surface portion of rear bumper 87 and rear surface portion 67*b* of hatch 67.

In FIG. 6, upper surface 75 of electrically powered vehicle 10 is a surface that can be seen when electrically powered vehicle 10 is viewed from a position away upwardly in a direction vertical to the ground in a state such that the tires of electrically powered vehicle 10 are in contact with the ground.

Accordingly, upper surface 75 of electrically powered vehicle 10 is mainly defined by engine roof 88, roof 66, and upper surface portion 67*a* of hatch 67.

In FIG. 7, bottom surface 76 of electrically powered vehicle 10 is a surface that can be seen when electrically powered vehicle 10 is viewed from a position away downwardly in the direction vertical to the ground in a state such that the tires of electrically powered vehicle 10 are in contact with the ground. As shown in this FIG. 7, electrically powered vehicle 10 includes a front wheel 18R and a front wheel 18L that are arranged in the width direction of the vehicle, and a rear wheel 19R and a rear wheel 19L that are arranged in the width direction of the vehicle. It is to be noted that front wheels 18R and 18L are disposed at the front side of the vehicle relative to rear wheels 19R and 19L. Power reception unit 20 is disposed between rear wheels 19R and 19L.

Here, as shown in FIG. 2 and FIG. 3, electrically powered vehicle 10 includes: a refueling portion (second connection portion) 77 provided in left side surface 71; a charging portion (first connection portion) 78 provided in right side surface 72; and a fuel tank 79 connected to refueling portion 77 via a pipe or the like. In the present specification, the term "connection portion" is intended to mean at least one of refueling portion 77 and charging portion 78.

In the present embodiment, refueling portion 77 is provided at rear fender 85L and charging portion 78 is provided at rear fender 85R. Charging portion 78 is connected to battery 15. Between charging portion 78 and battery 15, an interconnection and a transducer, which converts alternating current supplied from charging portion 78 into direct current, are provided.

Refueling portion 77 is connected to a refueling plug provided in a refueling device. The refueling plug (fuel supply unit) supplies fuel such as gasoline or liquid hydrogen to refueling portion 77, and the fuel supplied to refueling portion 77 is supplied to fuel tank 79. Thus, energy supplied from refueling portion 77 is energy different from electric power and is fuel such as gasoline or a hydrogen compound including hydrogen element.

A charging plug provided in a charging device is connected to charging portion 78. The charging plug (power supply unit) supplies electric power to charging portion 78. Alternating current, which is supplied to charging portion 78, is converted into direct current and is accumulated in battery 15.

Figure 8:
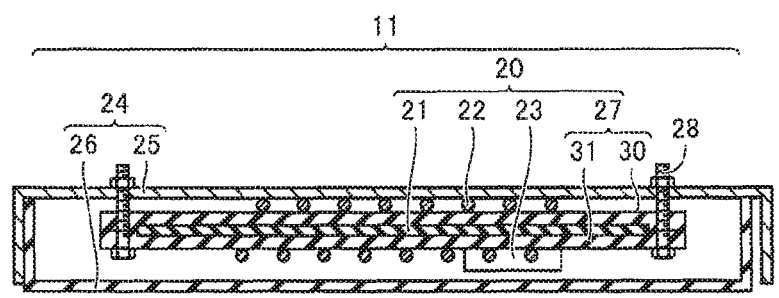
FIG. 8 is a cross sectional view showing a power reception device 11.

FIG. 8 is a cross sectional view showing power reception device 11 and FIG. 9 is an exploded perspective view of power reception device 11. As shown in FIG. 8 and FIG. 9, power reception device 11 includes power reception unit 20 and a case 24 having power reception unit 20 accommodated therein.

Case 24 includes: a shield 25 formed to open downwardly; and a cover portion 26 provided to close the opening of shield 25.

Shield 25 includes: a top plate portion 25*a*; and a circumferential wall portion 25*b* formed to extend downwardly from the circumferential edge portion of top plate portion 25*a*. Circumferential wall portion 25*b* includes a plurality of wall portions 25*c* to 25*f*, and the plurality of wall portions 25*c* to 25*f* are connected to one another to form annular circumferential wall portion 25*b*. Wall portion 25*c* and wall portion 25*e* are arranged in a direction in which winding axis O1 of second coil 22 extends, whereas wall portion 25*d* and wall portion 25*f* are arranged in a direction perpendicular to winding axis O1 of second coil 22. It is to be noted that the shape of shield 25 is not limited to such a shape and various types of shapes can be employed such as a polygonal shape, a circular shape, and an oval shape. The bottom end portion of circumferential wall portion 25*b* forms an opening, which is closed by cover portion 26.

Power reception unit 20 includes: a ferrite core 21 formed to have a plate-like shape; a fixation member 27 that sandwiches ferrite core 21 from the upper and lower sides; a second coil 22 wound around fixation member 27; and a capacitor 23 connected to second coil 22.

Ferrite core 21 includes a protrusion portion 29*a* and a protrusion portion 29*b*, each of which protrudes from the inside of second coil 22 in the direction in which winding axis O1 extends. Protrusion portion 29*a* protrudes from one end side of second coil 22, whereas protrusion portion 29*b* protrudes from the other end side of second coil 22. Thus, ferrite core 21 is formed to be longer than the length of second coil 22 in the direction in which winding axis O1 extends.

Figure 10:
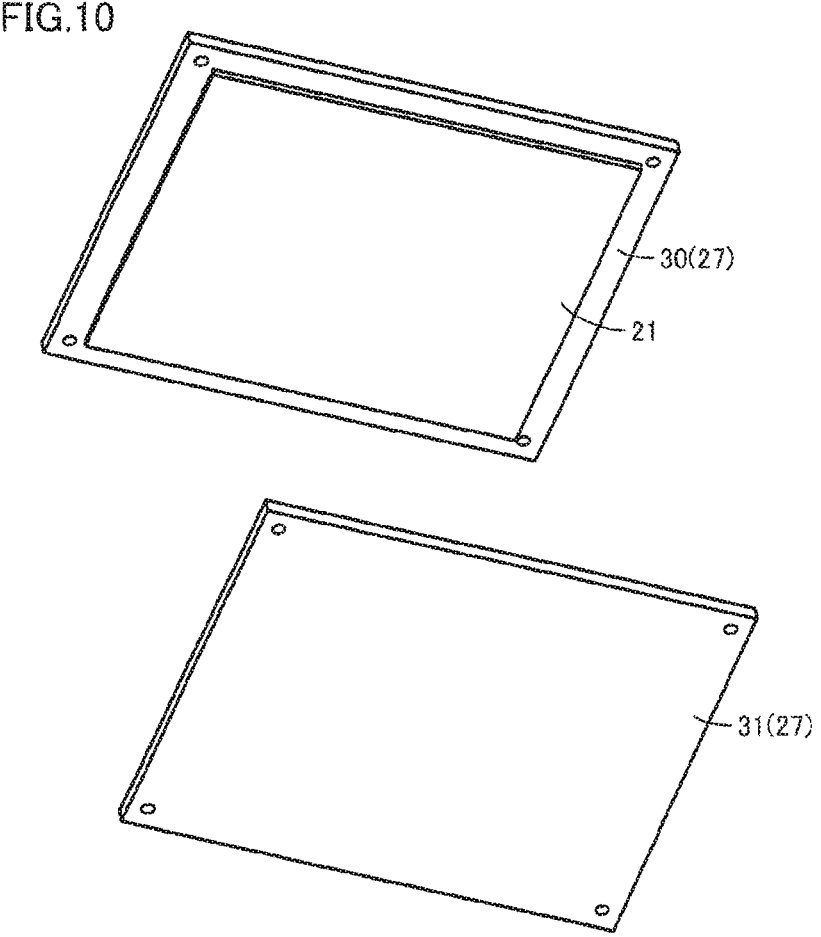
FIG. 10 is an exploded perspective view showing a fixation member 27 and a ferrite core 21.

FIG. 10 is an exploded perspective view showing fixation member 27 and ferrite core 21. As shown in FIG. 10, fixation member 27 includes: an insulation piece 30 disposed at the upper surface side of ferrite core 21; and an insulation piece 31 disposed at the lower surface side of ferrite core 21.

Insulation piece 30 and insulation piece 31 are fixed to each other through a bolt 28 shown in FIG. 9 or the like, and ferrite core 21 is sandwiched between insulation piece 30 and insulation piece 31. Because ferrite core 21 is sandwiched between insulation piece 30 and insulation piece 31, ferrite core 21 is protected.

Power reception device 11 thus formed is provided at the bottom surface 76 side of electrically powered vehicle 10 as shown in FIG. 7. Various types of methods can be employed to fix power reception device 11. For example, electrically powered vehicle 10 may include: side members 47 arranged in the width direction of the vehicle; and a plurality of cross members provided to connect side members 47 to each other, power reception device 11 being suspended from side members 47 and the cross members.

Thus, regarding the expression "power reception device 11 is disposed at the bottom surface 76 side", power reception device 11 does not need to be necessarily provided at a position that can be visually seen when electrically powered vehicle 10 is viewed from below electrically powered vehicle 10. Hence, for example, power reception device 11 is disposed at the lower side relative to floor panel 49.

Figure 11:
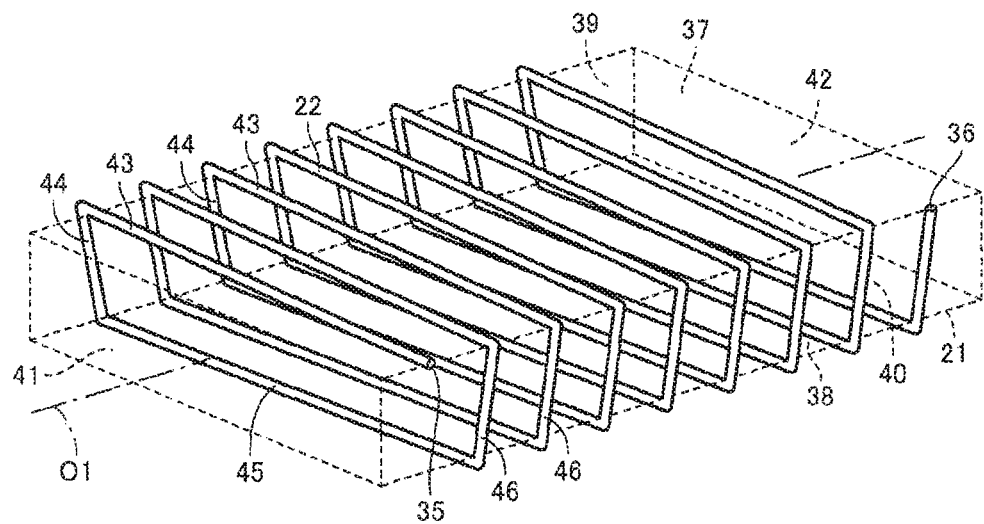
FIG. 11 is a perspective view showing a second coil 22.

FIG. 11 is a perspective view showing second coil 22. As shown in FIG. 11, second coil 22 includes a first end portion 35 and a second end portion 36. As second coil 22 extends from first end portion 35 to second end portion 36, second coil 22 is formed to surround winding axis O1 and be displaced in the direction in which winding axis O1 extends. Second coil 22 is formed by winding a coil wire for a plurality of times. It is to be noted that first end portion 35 and second end portion 36 are disposed at both ends of second coil 22 in the direction in which winding axis O1 extends.

In the example shown in FIG. 11, ferrite core 21 is formed to have a substantially rectangular solid shape, and ferrite core 21 includes: an upper surface 37; a bottom surface 38 opposite to upper surface 37 in the thickness direction; side surfaces 39 and 40 arranged in the short direction; and end surfaces 41 and 42 arranged in the longitudinal direction. It is to be noted that ferrite core 21 may be constructed of a plurality of divided ferrite pieces.

Second coil 22 includes: long side portions 43 disposed on upper surface 37; short side portions 44 extending downwardly from the end portions of long side portions 43 and disposed on side surface 39; long side portions 45 connected to short side portions 44 and disposed on bottom surface 38; and short side portions 46 connected to the end portions of long side portions 45 and disposed on side surface 40.

One turn of the coil wire around the circumferential surfaces of ferrite core 21 is provided by one long side portion 43, one short side portion 44, one long side portion 45, and one short side portion 46.

Second coil 22, which is wound for a plurality of times, includes the plurality of long side portions 43, the plurality of short side portions 44, the plurality of long side portions 45, and the plurality of short side portions 46.

Figure 12:
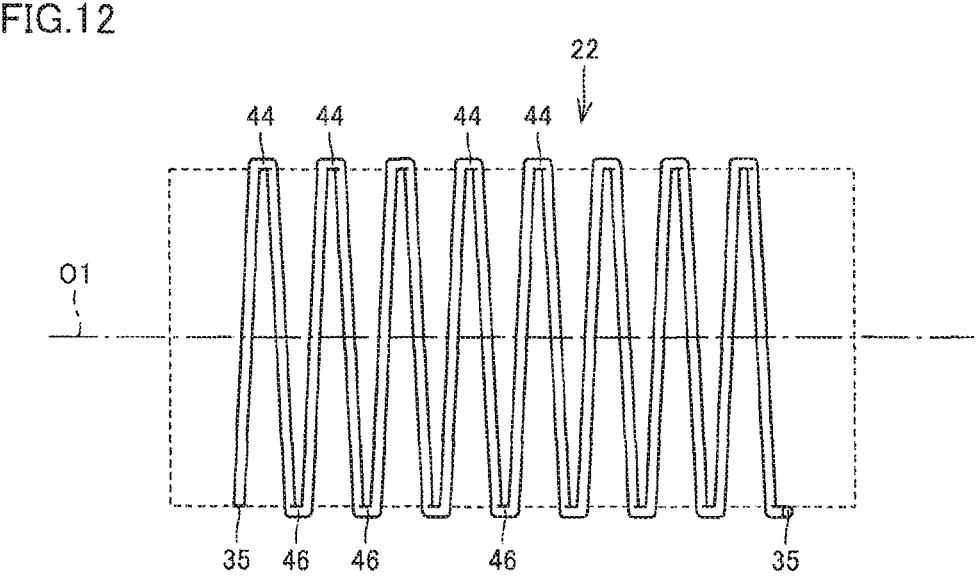
FIG. 12 is a plan view of second coil 22 when viewed in plan.

FIG. 12 is a plan view of second coil 22 when viewed in plan. As shown in FIG. 12, the plurality of short side portions 46 are arranged in the direction in which winding axis O1 extends, and the plurality of short side portions 44 are arranged in a similar manner in the direction in which winding axis O1 extends.

Short side portions 44 and short side portions 46 are disposed on the same imaginary plane, face each other with winding axis O1 being interposed therebetween, and are arranged in the horizontal direction.

In the present embodiment, second coil 22 is formed to have a quadrangular shape when viewed from the front surface, but various types of shapes can be employed for the shape of the coil, such as an elliptical shape, an oval shape, and a polygon shape.

Figure 13:
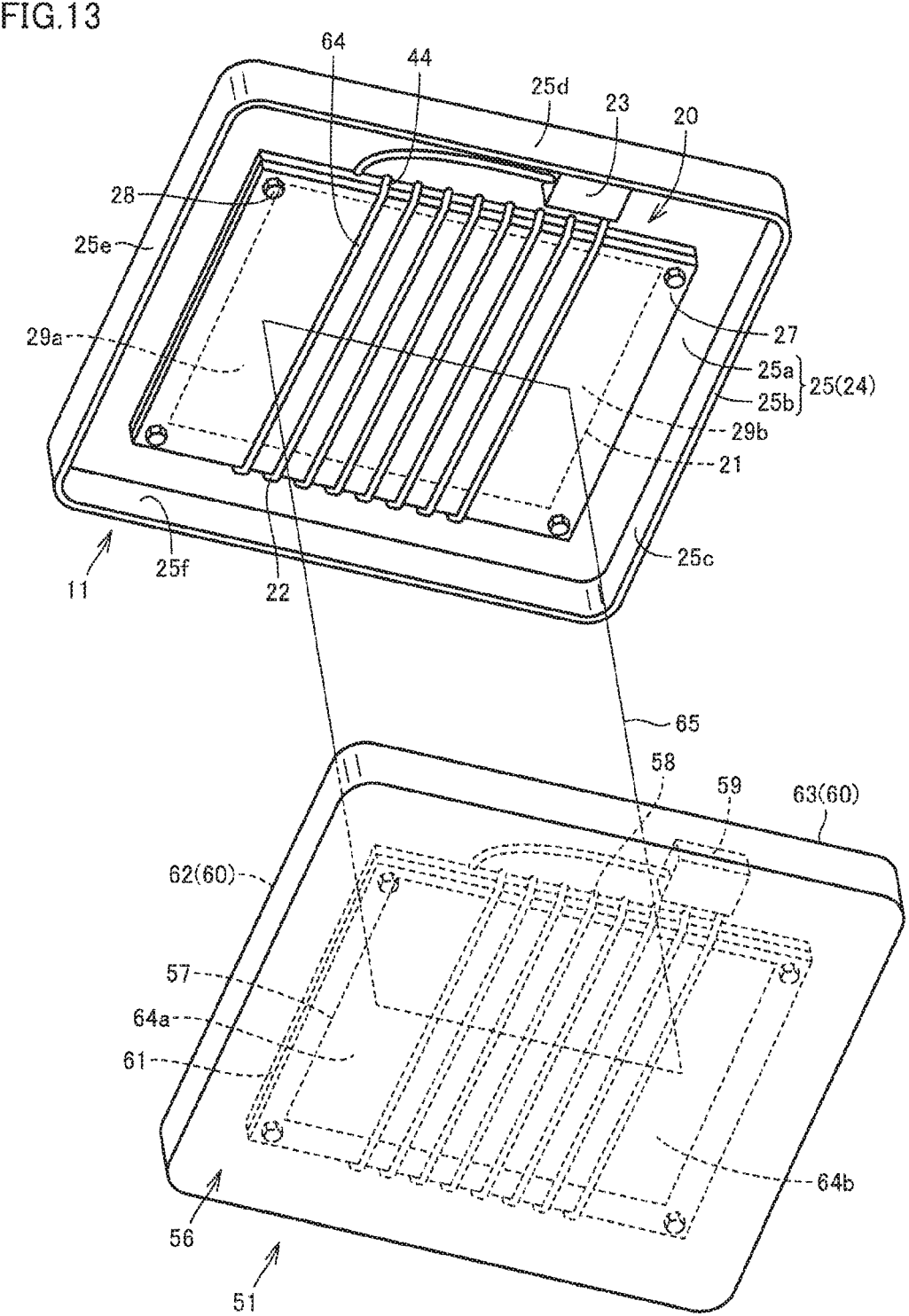
FIG. 13 is a perspective view showing a state in which a power reception unit 20 and a power transmission unit 56 are arranged to face each other.

FIG. 13 is a perspective view showing a state in which power reception unit 20 and power transmission unit 56 are disposed to face each other. It is to be noted that in FIG. 13, cover portion 26 provided in power reception device 11 is not shown in the figure.

As shown in FIG. 13, during transfer of electric power, power reception unit 20 and power transmission unit 56 are disposed to face each other with an air gap therebetween.

Power transmission unit 56 includes: a case 60 having first coil 58 and the like contained therein; a fixation member 61 contained in case 60; ferrite core 57 contained in fixation member 61; first coil 58 attached onto the outer circumferential surface of fixation member 61; and capacitor 59 contained in case 60.

Case 60 includes: a shield 62 made of a metal material such as copper; and a cover member 63 made of a resin and provided on shield 62.

Shield 62 includes a bottom surface portion, and a circumferential wall portion formed to have an annular shape rising upwardly from the outer circumferential edge of the bottom surface portion, and the circumferential wall portion has an upper end portion extending in an annular manner to provide an opening that opens upwardly. Cover member 63 is formed to close the opening formed by the upper end portion of the circumferential wall portion of shield 62.

Ferrite core 57 includes a protrusion portion 64a and a protrusion portion 64b, each of which protrudes in the direction in which the winding axis of first coil 58 extends. Protrusion portion 64a is formed to protrude from one end side of first coil 58, whereas protrusion portion 64b protrudes from the other end side of first coil 58.

Fixation member 61 includes: an insulation piece disposed at the upper surface side of ferrite core 57; and an insulation piece disposed at the lower surface side of ferrite core 57. Ferrite core 57 is sandwiched between these two insulation pieces. The two insulation pieces are fixed to each other by a fastening member such as a bolt and a nut, thereby sandwiching ferrite core 57 between the two insulation pieces. First coil 58 is wound around the outer circumferential surface of fixation member 61.

Figure 14:
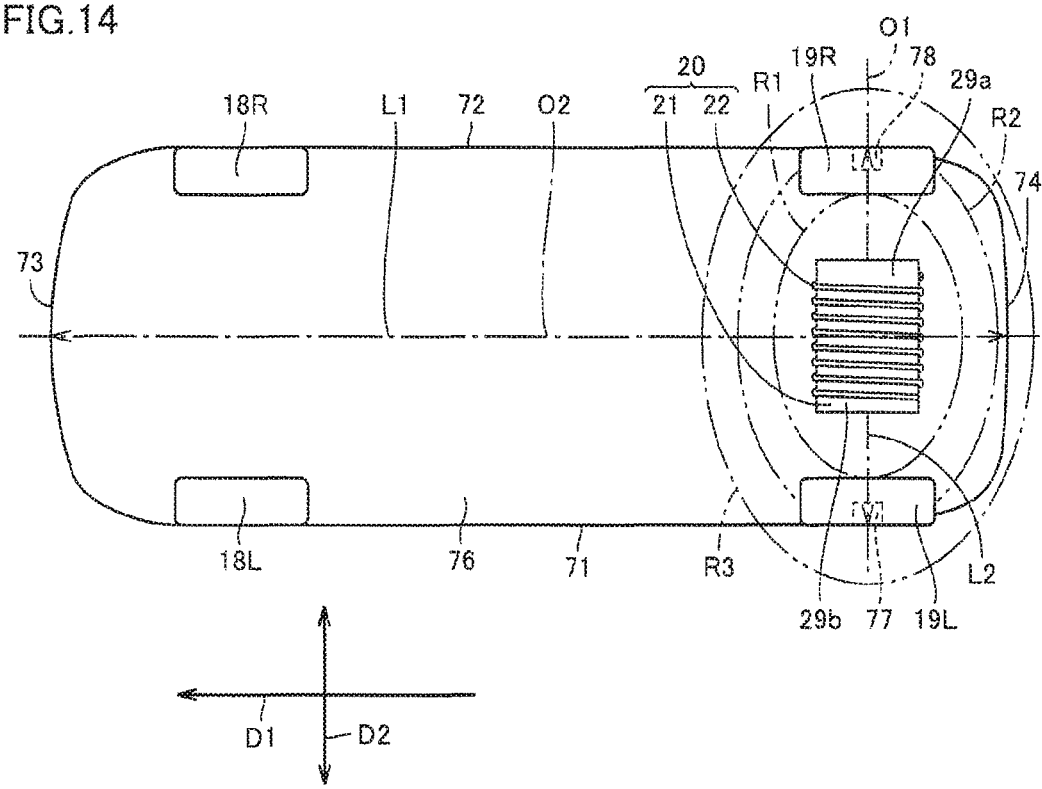
FIG. 14 is a plan view schematically showing a layout of a power reception unit 20 (second coil 22), a refueling portion 77 and a charging portion 78 when electrically powered vehicle 10 is viewed from above in a direction vertical to electrically powered vehicle 10.

FIG. 14 is a plan view schematically showing a layout of power reception unit 20 (second coil 22), refueling portion 77, and charging portion 78 when electrically powered vehicle 10 is viewed from above in the direction vertical to electrically powered vehicle 10.

As shown in FIG. 14, electrically powered vehicle 10 includes left side surface 71, right side surface 72, front surface 73, and rear surface 74.

In the example shown in FIG. 14, central line O2 passes through the central portion of electrically powered vehicle 10 in width direction D2 and extends in the front-rear direction of electrically powered vehicle 10.

Second coil 22 is disposed such that winding axis O1 is directed in the horizontal direction, and winding axis O1 extends to pass through right side surface 72 and left side surface 71. The expression "winding axis O1 is directed in the horizontal direction" includes both a case where winding axis O1 extends completely in the horizontal direction and a case where winding axis O1 is directed substantially in the horizontal direction. The expression "winding axis O1 is directed substantially in the horizontal direction" is intended to mean that a crossing angle between the imaginary horizontal plane and winding axis O1 is 10° or less, for example. In the present first embodiment, second coil 22 is disposed such that winding axis O1 passes through right side surface 72 and left side surface 71.

In FIG. 1, in the power transfer system according to the present embodiment, a difference between the natural frequency of power transmission unit 56 and the natural frequency of power reception unit 20 is 10% or less of the natural frequency of power reception unit 20 or power transmission unit 56. By setting the natural frequency of each of power transmission unit 56 and power reception unit 20 to fall within such a range, power transfer efficiency can be improved. Meanwhile, if the difference in natural frequency becomes larger than 10% of the natural frequency of power reception unit 20 or power transmission unit 56, the power transfer efficiency becomes less than 10%, which results in problems such as a long charging time for battery 15.

Here, when no capacitor 59 is provided, the expression "natural frequency of power transmission unit 56" is intended to mean an oscillation frequency at which the electric circuit formed by the inductance of first coil 58 and the capacitance of first coil 58 freely oscillates. When capacitor 59 is provided, the expression "natural frequency of power transmission unit 56" is intended to mean an oscillation frequency at which the electric circuit formed by the capacitances of first coil 58 and capacitor 59 and the inductance of first coil 58 freely oscillates. In the above-described electric circuit, the natural frequency when the damping force and the electric resistance are set at zero or substantially zero is also called "resonance frequency of power transmission unit 56".

Likewise, when no capacitor 23 is provided, the expression "natural frequency of power reception unit 20" is intended to mean an oscillation frequency at which the electric circuit formed by the inductance of second coil 22 and the capacitance of second coil 22 freely oscillates. When capacitor 23 is provided, the expression "natural frequency of power reception unit 20" is intended to mean an oscillation frequency at which the electric circuit formed by the capacitances of second coil 22 and capacitor 23 and the inductance of second coil 22 freely oscillates. In the above-described electric circuit, the natural frequency when the damping force and the electric resistance are set at zero or substantially zero is also called "resonance frequency of power reception unit 20".

Figure 15:
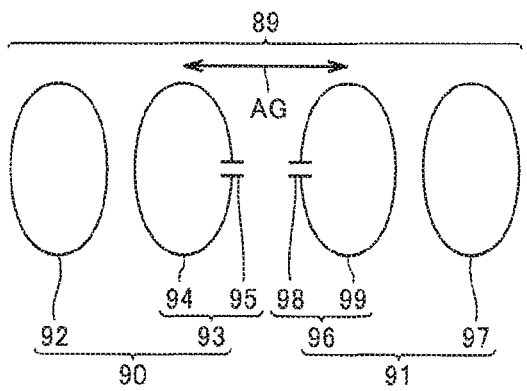
FIG. 15 shows a simulation model of the power transfer system.
Figure 16:
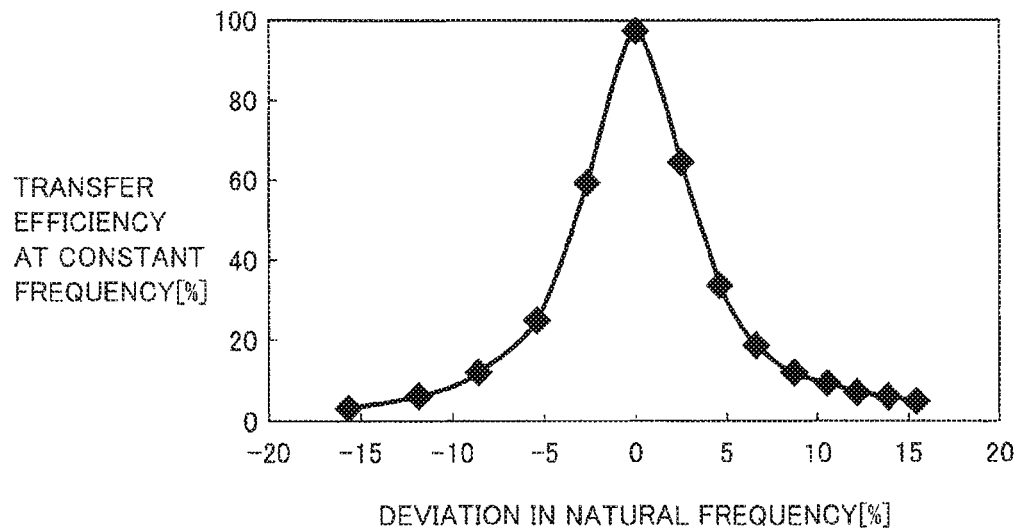
FIG. 16 is a graph showing a relation between power transfer efficiency and deviation in natural frequency between power transmission unit 93 and power reception unit 96.

With reference to FIG. 15 and FIG. 16, the following describes a result of simulation in which a relation is analyzed between the difference in natural frequency and the power transfer efficiency. FIG. 15 shows a simulation model of the power transfer system. The power transfer system includes a power transmission device 90 and a power reception device 91. Power transmission device 90 includes a coil 92 (electromagnetic induction coil) and a power transmission unit 93. Power transmission unit 93 includes a coil 94 (resonance coil) and a capacitor 95 provided in coil 94.

Power reception device 91 includes a power reception unit 96 and a coil 97 (electromagnetic induction coil). Power reception unit 96 includes a coil 99 and a capacitor 98 connected to coil 99 (resonance coil).

Assume that the inductance of coil 94 is inductance Lt and the capacitance of capacitor 95 is capacitance C1. Assume that the inductance of coil 99 is inductance Lr and the capacitance of capacitor 98 is capacitance C2. By setting each of the parameters in this way, natural frequency f1 of power transmission unit 93 is indicated by the following formula (1) and natural frequency f2 of power reception unit 96 is indicated by the following formula (2):

$$f1=1/\{2\pi(Lt \times C1)^{1/2}\} \quad (1)$$

$$f2=1/\{2\pi(Lr \times C2)^{1/2}\} \quad (2)$$

Here, FIG. 16 shows a relation between the power transfer efficiency and the deviation in natural frequency between power transmission unit 93 and power reception unit 96 when only inductance Lt is changed with inductance Lr and capacitances C1, C2 being fixed. In this simulation, a relative positional relation between coil 94 and coil 99 is fixed, and the frequency of current supplied to power transmission unit 93 is constant.

In the graph shown in FIG. 16, the horizontal axis represents the deviation (%) in natural frequency whereas the vertical axis represents the transfer efficiency (%) at the constant frequency. The deviation (%) in natural frequency is indicated by the following formula (3):

$$(\text{Deviation in natural frequency})=\{(f1-f2)/f2\} \times 100(\%) \quad (3)$$

As apparent also from FIG. 16, when the deviation (%) in natural frequency is ±0%, the power transfer efficiency is close to 100%. When the deviation (%) in natural frequency is ±5%, the power transfer efficiency is 40%. When the deviation (%) in natural frequency is ±10%, the power transfer efficiency is 10%. When the deviation (%) in natural frequency is ±15%, the power transfer efficiency is 5%. Thus, it is understood that the power transfer efficiency can be improved by setting the natural frequency of each of the power transmission unit and the power reception unit such that the absolute value (difference in natural frequency) of the deviation (%) in natural frequency falls within a range of 10% or less of the natural frequency of power reception unit 96. Further, it is understood that the power transfer efficiency can be more improved by setting the natural frequency of each of the power transmission unit and the power reception unit such that the absolute value of the deviation (%) in natural frequency falls within a range of 5% or less of the natural frequency of power reception unit 96. It is to be noted that electromagnetic field analysis software (JMAG®) provided by JSOL Corporation) is employed as simulation software.

The following describes an operation of the power transfer system according to the present embodiment.

In FIG. 1, first coil 58 is supplied with AC power from high-frequency power driver 54. On this occasion, the electric power is supplied such that the alternating current flowing through first coil 58 has a specific frequency.

When the current having the specific frequency flows through first coil 58, an electromagnetic field, which oscillates at the specific frequency, is formed around first coil 58.

Second coil 22 is disposed in a predetermined range from first coil 58 and receives electric power from the electromagnetic field formed around first coil 58.

In the present embodiment, helical coils are employed for second coil 22 and first coil 58. Accordingly, a magnetic field and an electric field, which oscillate at the specific frequency, are formed around first coil 58 and second coil 22 receives electric power mainly from the magnetic field.

Here, the following describes the magnetic field formed around first coil 58 and having the specific frequency. The "magnetic field having the specific frequency" is typically relevant to the power transfer efficiency and the frequency of current supplied to first coil 58. First described is a relation between the power transfer efficiency and the frequency of current supplied to first coil 58. The power transfer efficiency when transferring electric power from first coil 58 to second coil 22 is changed depending on various factors such as a distance between first coil 58 and second coil 22. For example, the natural frequencies (resonance frequencies) of power transmission unit 56 and power reception unit 20 are assumed as natural frequency f0, the frequency of current supplied to first coil 58 is assumed as frequency f3, and the air gap between second coil 22 and first coil 58 is assumed as air gap AG.

Figure 17:
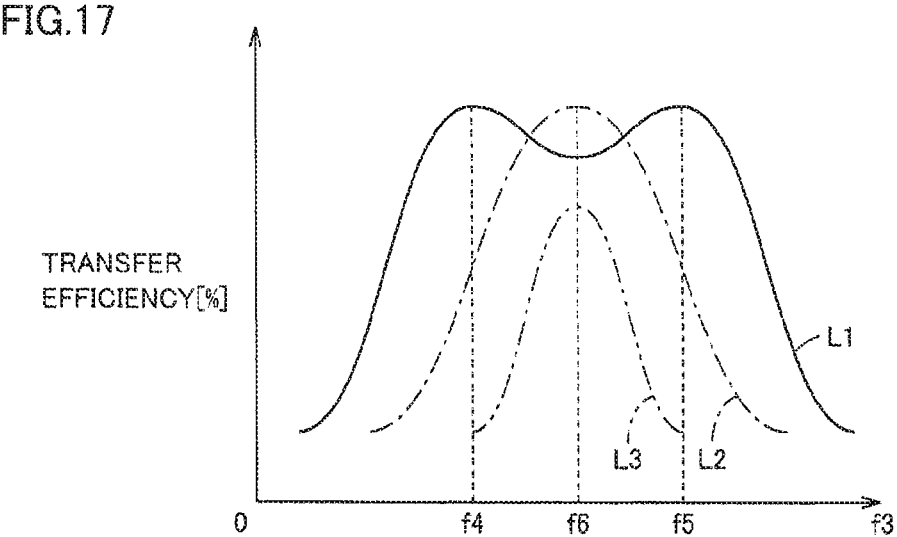
FIG. 17 is a graph showing a relation between the power transfer efficiency and frequency f3 of current supplied to a first coil 58 when an air gap AG is changed with natural frequency f0 being fixed.

FIG. 17 is a graph indicating a relation between the power transfer efficiency and frequency f3 of current supplied to first coil 58 when air gap AG is changed with natural frequency f0 being fixed.

In the graph shown in FIG. 17, the horizontal axis represents frequency f3 of the current supplied to first coil 58 whereas the vertical axis represents the power transfer efficiency (%). An efficiency curve L1 schematically represents a relation between the power transfer efficiency when air gap AG is small and frequency f3 of the current supplied to first coil 58. As indicated by efficiency curve L1, when air gap AG is small, peaks of the power transfer efficiency appear at frequencies f4, f5 (f4<f5). When air gap AG is made larger, the two peaks at which the power transfer efficiency becomes high are changed to come closer to each other. Then, as indicated by an efficiency curve L2, when air gap AG is made larger than a predetermined distance, one peak of the power transfer efficiency appears. The peak of the power transfer efficiency appears when the current supplied to first coil 58 has a frequency f6. When air gap AG is made further larger from the state of efficiency curve L2, the peak of the power transfer efficiency becomes smaller as indicated by an efficiency curve L3.

For example, as a technique of improving the power transfer efficiency, the following first technique can be considered. The first technique is to change a characteristic of the power transfer efficiency between power transmission unit 56 and power reception unit 20 by changing the capacitances of capacitor 59 and capacitor 23 in accordance with air gap AG with the frequency of the current supplied to first coil 58 shown in FIG. 1 being constant. Specifically, with the frequency of the current supplied to first coil 58 being constant, the capacitances of capacitor 59 and capacitor 23 are adjusted to attain a peak of the power transfer efficiency. In this technique, irrespective of the size of air gap AG, the frequency of the current flowing through first coil 58 and second coil 22 is constant. It is to be noted that as the technique of changing the characteristic of the power transfer efficiency, the following techniques can be also employed: a technique of using a matching device provided between power transmission device 50 and high-frequency power driver 54; and a technique of using converter 14.

Meanwhile, a second technique is a technique of adjusting, based on the size of air gap AG, the frequency of the current supplied to first coil 58. For example, in FIG. 17, when the power transfer characteristic corresponds to efficiency curve L1, first coil 58 is supplied with current having frequency f4 or frequency f5. On the other hand, when the frequency characteristic corresponds to efficiency curve L2 or L3, first coil 58 is supplied with current having frequency f6. In this case, the frequency of the current flowing through each of first coil 58 and second coil 22 is changed in accordance with the size of air gap AG.

In the first technique, the frequency of the current flowing through first coil 58 becomes a fixed, constant frequency. In the second technique, the frequency thereof flowing through first coil 58 becomes a frequency appropriately changed according to air gap AG. With the first technique, the second technique, or the like, first coil 58 is supplied with current having a specific frequency set to attain high power transfer efficiency. Because the current having the specific frequency flows through first coil 58, a magnetic field (electromagnetic field), which oscillates at the specific frequency, is formed around first coil 58. Power reception unit 20 receives electric power from power transmission unit 56 via the magnetic field formed between power reception unit 20 and power transmission unit 56 and oscillating at the specific frequency. Therefore, "the magnetic field oscillating at the specific frequency" is not necessarily a magnetic field having a fixed frequency. It is to be noted that in the above-described example, the frequency of the current supplied to first coil 58 is set based on air gap AG, but the power transfer efficiency is also changed according to other factors such as a deviation in the horizontal direction between first coil 58 and second coil 22, so that the frequency of the current supplied to first coil 58 may be adjusted based on the other factors.

It is to be also noted that the example employing the helical coil as the resonance coil has been illustrated, but when an antenna such as a meander line antenna is employed as the resonance coil, an electric field having the specific frequency is formed around first coil 58 as a result of flow of the current having the specific frequency through first coil 58. Through this electric field, electric power is transferred between power transmission unit 56 and power reception unit 20.

Figure 18:
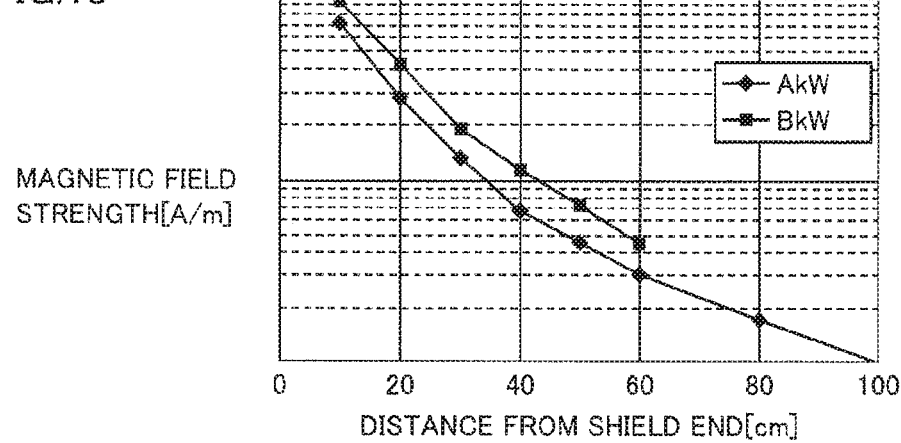
FIG. 18 is a graph showing distribution of a magnetic field in a direction in which a winding axis O1 extends.

In the power transfer system according to the present embodiment, efficiency in power transmission and power reception is improved by employing a near field (evanescent field) in which an "electrostatic magnetic field" of the electromagnetic field is dominant. FIG. 18 shows a relation between a distance from the electric current source or magnetic current source and the strength of the electromagnetic field. Referring to FIG. 18, the electromagnetic field is constituted of three components. A curve k1 represents a component in inverse proportion to the distance from the wave source, and is referred to as "radiation electromagnetic field". A curve k2 represents a component in inverse proportion to the square of the distance from the wave source, and is referred to as "induction electromagnetic field". A curve k3 represents a component in inverse proportion to the cube of the distance from the wave source, and is referred to as "electrostatic magnetic field". Assuming that the wavelength of the electromagnetic field is represented by "$\lambda$", $\lambda/2\pi$ represents a distance in which the strengths of the "radiation electromagnetic field", the "induction electromagnetic field", and the "electrostatic magnetic field" are substantially the same.

The "electrostatic magnetic field" is a region in which the strength of the electromagnetic wave is abruptly decreased as the distance is farther away from the wave source. In the power transfer system according to the present embodiment, the near field (evanescent field), in which this "electrostatic magnetic field" is dominant, is utilized for transfer of energy (electric power). In other words, by resonating power transmission unit 56 and power reception unit 20 (for example, a pair of LC resonant coils) having close natural frequencies in the near field in which the "electrostatic magnetic field" is dominant, the energy (electric power) is transferred from power transmission unit 56 to the other side, i.e., power reception unit 20. This "electrostatic magnetic field" does not propagate energy to a distant place. Hence, the resonance method allows for electric power transmission with less energy loss as compared with the electromagnetic wave in which the "radiation electromagnetic field" propagating energy to a distance place is utilized to transfer energy (electric power).

Thus, in this power transfer system, by resonating the power transmission unit and the power reception unit with each other through the electromagnetic field, electric power is transmitted contactlessly between the power transmission unit and the power reception unit. The electromagnetic field thus formed between the power reception unit and the power transmission unit may be called, for example, "near field resonance coupling field". Further, a coupling coefficient κ between the power transmission unit and the power reception unit is about 0.3 or less, preferably, 0.1 or less, for example. Coupling coefficient κ may also fall within a range of about 0.1 to about 0.3. Coupling coefficient κ is not limited to such a value, and various values to attain excellent electric power transfer can be employed.

The coupling between power transmission unit 56 and power reception unit 20 during electric power transfer in the present embodiment is called, for example, "magnetic resonance coupling", "magnetic field resonance coupling", "magnetic field resonance coupling", "near field resonance coupling", "electromagnetic field resonance coupling", or "electric field resonance coupling".

The term "electromagnetic field resonance coupling" is intended to indicate coupling including any of the "magnetic resonance coupling", the "magnetic field resonance coupling", and the "electric field resonance coupling".

Each of first coil 58 of power transmission unit 56 and second coil 22 of power reception unit 20 as described in the present specification employs an antenna having a coil shape, so that power transmission unit 56 and power reception unit 20 are coupled to each other mainly by a magnetic field. Thus, power transmission unit 56 and power reception unit 20 are coupled to each other by means of the "magnetic resonance coupling" or the "magnetic field resonance coupling".

It is to be noted that an antenna such as a meander line antenna can be employed as first coil 58 and second coil 22, for example. In this case, power transmission unit 56 and power reception unit 20 are coupled to each other mainly through electric field. On this occasion, power transmission unit 56 and power reception unit 20 are coupled to each other by means of the "electric field resonance coupling".

In FIG. 13, when transferring electric power between power reception unit 20 and power transmission unit 56, first coil 58 is supplied with alternating current having a predetermined frequency.

By supplying the predetermined alternating current to first coil 58, an electromagnetic field oscillating at a predetermined frequency is formed around first coil 58. Then, second coil 22 receives electric power from the electromagnetic field. Moreover, a magnetic path 65 is formed between power reception unit 20 and power transmission unit 56.

Magnetic path 65 is formed to pass through protrusion portion 29a, the inside of second coil 22, protrusion portion 29b, the air gap, protrusion portion 64b, the inside of first coil 58, protrusion portion 64a, the air gap, and protrusion portion 29a.

Figure 19:
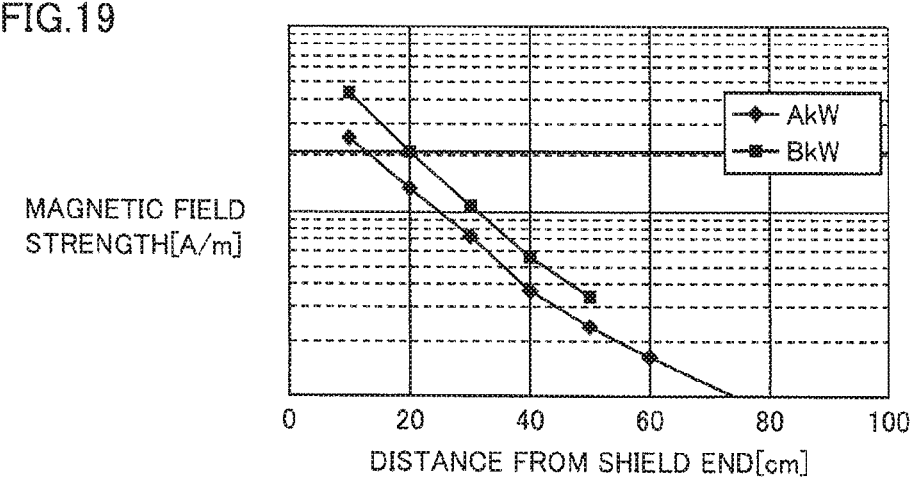
FIG. 19 is a graph showing distribution of a magnetic field in a direction perpendicular to winding axis O1.

Each of FIG. 18 and FIG. 19 is a graph showing distribution of strength of the magnetic field formed around second coil 22. FIG. 18 is a graph showing distribution of the magnetic field in the direction in which winding axis O1 extends. The horizontal axis of the graph shown in FIG. 18 represents a distance (cm) from wall portion 25c or wall portion 25e shown in FIG. 9 in the direction in which winding axis O1 extends. The vertical axis of the graph represents the magnetic field strength.

FIG. 19 is a graph showing distribution of the magnetic field in the direction perpendicular to winding axis O1. As shown in FIG. 18, the horizontal axis of the graph represents a distance (cm) from wall portion 25d or wall portion 25f shown in FIG. 13 in the direction perpendicular to winding axis O1. The vertical axis of the graph represents the strength of the magnetic field.

As shown in FIG. 18 and FIG. 19, it is understood that a magnetic field having high strength is distributed to be long in the direction in which winding axis O1 extends.

Figure 20:
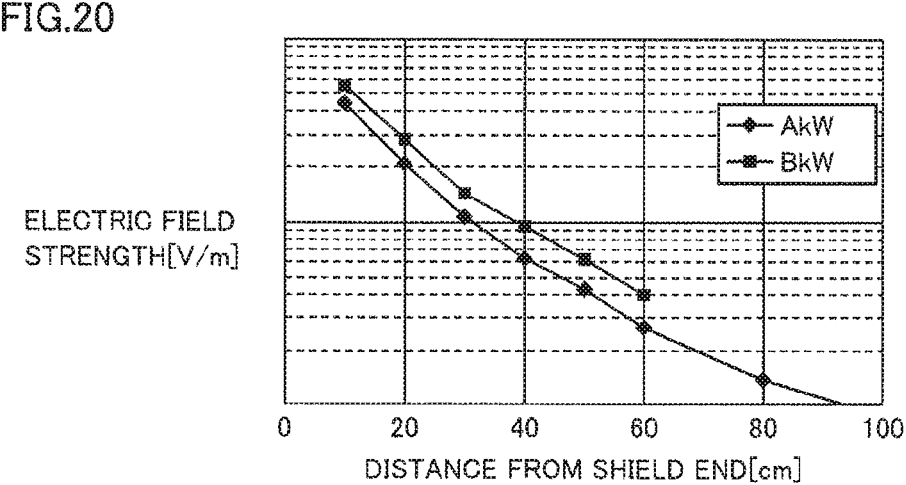
FIG. 20 is a graph showing distribution of an electric field in the direction in which winding axis O1 extends.
Figure 21:
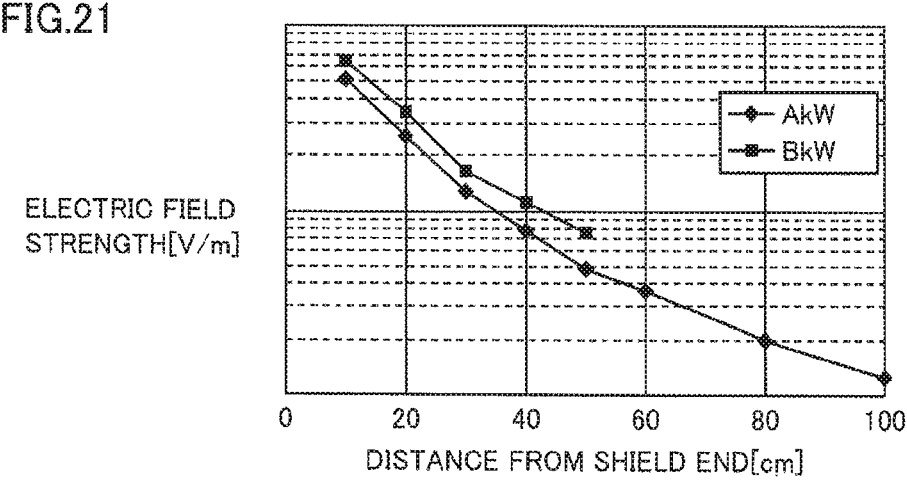
FIG. 21 is a graph showing distribution of an electric field in the direction perpendicular to winding axis O1.

Each of FIG. 20 and FIG. 21 is a graph showing distribution of the electric field formed around second coil 22. FIG. 20 is a graph showing distribution of the electric field in the direction in which winding axis O1 extends. The horizontal axis of the graph represents a distance (cm) from wall portion 25c or wall portion 25e shown in FIG. 13 in the direction in which winding axis O1 extends. The vertical axis represents the strength of the electric field.

FIG. 21 is a graph showing distribution of the electric field in the direction perpendicular to winding axis O1. The horizontal axis represents a distance (cm) from wall portion 25d or wall portion 25f shown in FIG. 13 in the direction perpendicular to winding axis O1.

As shown in FIG. 20 and FIG. 21, it is understood that the electric field is distributed to be long in the direction perpendicular to winding axis O1. On the other hand, as apparent from FIG. 20 and FIG. 21, it is understood that the strength of the electric field itself is weak.

Here, in FIG. 14, second coil 22 is disposed such that winding axis O1 extends in width direction D2. Central line O2 shown in FIG. 14 is an imaginary line located in the central portion of electrically powered vehicle 10 in width direction D2 and extending in the front-rear direction of electrically powered vehicle 10. In this case, the length of electrically powered vehicle 10 in the front-rear direction is defined as a distance L1. Furthermore, when bottom surface 76 and winding axis O1 are viewed from above electrically powered vehicle 10, the length of winding axis O1 located to fall within bottom surface 76 is defined as a length L2. As apparent from FIG. 14, length L2 is shorter than distance L1. Winding axis O1 passes through rear wheel 19R and rear wheel 19L.

In FIG. 14, a first strength region R1 surrounded by a double dashed line represents a region having high strength in the electromagnetic field formed around second coil 22 during transfer of electric power. Furthermore, a second strength region R2 represents a region having relatively high strength and being lower in electromagnetic field strength than first strength region R1. A third strength region R3 represents a region having relatively high strength and being lower in electromagnetic field strength than second strength region R2.

Second coil 22 is disposed such that length L2 is shorter than distance L1. Accordingly, when bottom surface 76 and third strength region R3 are viewed from above electrically powered vehicle 10, at least a part of third strength region R3 is located on the outside of bottom surface 76. In other words, the region of third strength region R3 located to fall within bottom surface 76 is relatively small.

Figure 22:
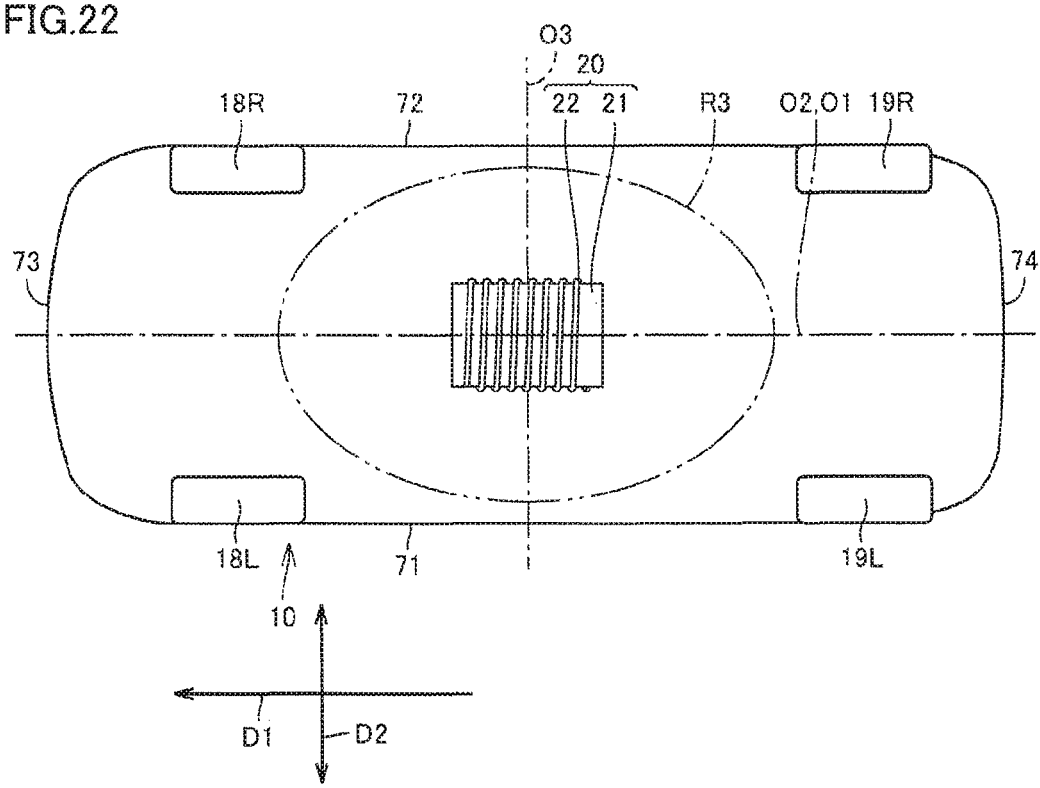
FIG. 22 is a plan view schematically showing electrically powered vehicle 10 as a comparative example.

FIG. 22 is a plan view schematically showing electrically powered vehicle 10 as a comparative example. In the example shown in this FIG. 22, second coil 22 is disposed to be located in the central portion of electrically powered vehicle 10 in the front-rear direction and also in the central portion thereof in width direction D2. Furthermore, second coil 22 is disposed such that winding axis O1 corresponds to central line O2.

In the example shown in this FIG. 22, when electrically powered vehicle 10 is viewed in plan, third strength region R3 is entirely located to fall within bottom surface 76. On the other hand, according to electrically powered vehicle 10 of the present first embodiment, a part of third strength region R3 is located outside of bottom surface 76, as shown in FIG. 14.

Accordingly, the electromagnetic field having high strength is suppressed from being distributed over a relatively wide range below bottom surface 76. Thus, the in-vehicle devices mounted in electrically powered vehicle 10 can be less affected by an electromagnetic field. It is to be noted that examples of the in-vehicle device may be a vehicle ECU 12, a rectifier 13, a converter 14, a battery 15, a power control unit 16, a motor unit 17, and the like.

When second coil 22 and central line O2 are viewed in plan from above electrically powered vehicle 10, central line O2 passes through second coil 22. Accordingly, first strength region R1 can be suppressed from leaking to the outside of the vehicle, so that the electronic devices located around electrically powered vehicle 10 can be suppressed from being affected by an electromagnetic field. In the example shown in FIG. 14, the central portion of second coil 22 in the direction in which winding axis O1 extends is located above central line O2.

In FIG. 14, second coil 22 is disposed such that winding axis O1 passes through rear wheel 19R and rear wheel 19L. Accordingly, rear wheel 19R and rear wheel 19L suppress second strength region R2 from leaking to an area around electrically powered vehicle 10. Thereby, an electromagnetic field having high strength is also suppressed from leaking to the outside of electrically powered vehicle 10.

As shown in FIGS. 2 and 3, second coil 22 is provided at the rear side of electrically powered vehicle 10 relative to doors 83R and 83L. There may be a case where a passenger such as a driver gets in or out of the vehicle while electric power is being transferred between power reception unit 20 and power transmission unit 56. At this time, an electronic device carried by the passenger can be less affected by an electromagnetic field formed around power reception unit 20.

In this case, the expression "second coil 22 is located at the rear side relative to doors 83R and 83L" also includes a case where the entire second coil 22 is located completely at the rear side relative to the rear end portions of doors 83R and 83L, and also a case where a part of second coil 22 is located at the front side relative to the rear end portions of doors 83R and 83L. Even if a part of second coil 22 is located at the front side relative to the rear end portions of doors 83R and 83L, winding axis O1 is located at the rear side relative to the rear end portions of doors 83R and 83L.

In FIG. 2, refueling portion 77 is provided in a portion of left side surface 71 that is located above rear wheel 19L. Accordingly, also during transfer of electric power, an electromagnetic field having high strength is suppressed from reaching the area around refueling portion 77. Consequently, when an oil supply operator performs a refueling operation, an electromagnetic field having high strength can be suppressed from reaching the electronic device carried by the oil supply operator.

In FIG. 3, charging portion 78 is provided in a portion of right side surface 72 that is located above rear wheel 19R. Accordingly, even if a charging operator performs a charging operation in an area around charging portion 78 during transfer of electric power, an electromagnetic field having high strength can be suppressed from reaching the electronic device carried by the charging operator.

Although an explanation has been given in the present first embodiment with regard to the example in which each of refueling portion 77 and charging portion 78 is disposed at the rear side relative to doors 83L and 83R, at least one of charging portion 78 and charging portion 78 may be disposed at the front side relative to the doors.

Figure 23:
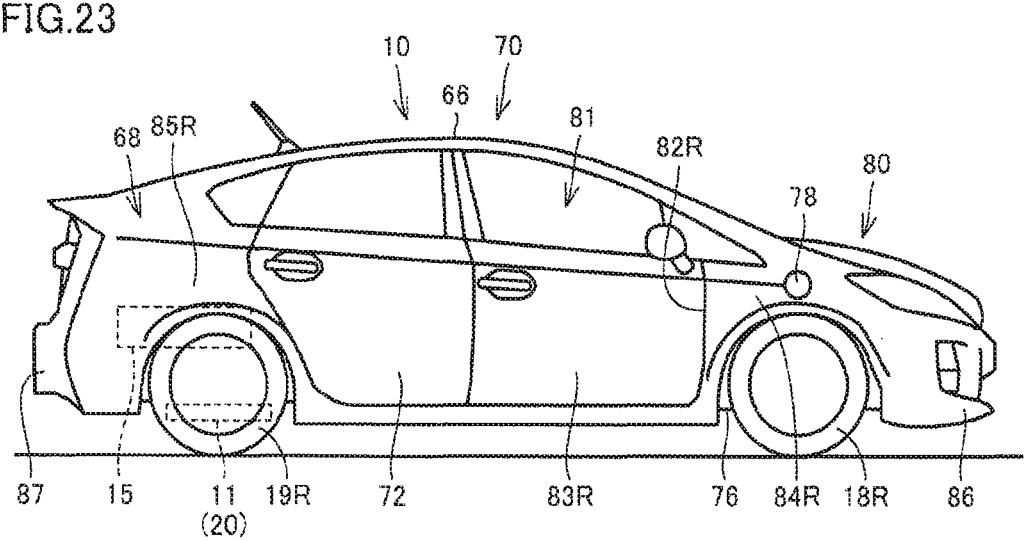
FIG. 23 is a right side view showing the first modification of electrically powered vehicle 10 according to the present first embodiment.

FIG. 23 is a right side view showing the first modification of electrically powered vehicle 10 according to the present first embodiment. In the example shown in this FIG. 23, charging portion 78 is provided at the front side relative to door 83R. In the example shown in this FIG. 23, charging portion 78 is provided in a portion of right side surface 72 that is located above front wheel 18R.

In the present first embodiment, second coil 22 is disposed such that winding axis O1 extends in width direction D2, but the manner of mounting of second coil 2 is not limited thereto.

Figure 24:
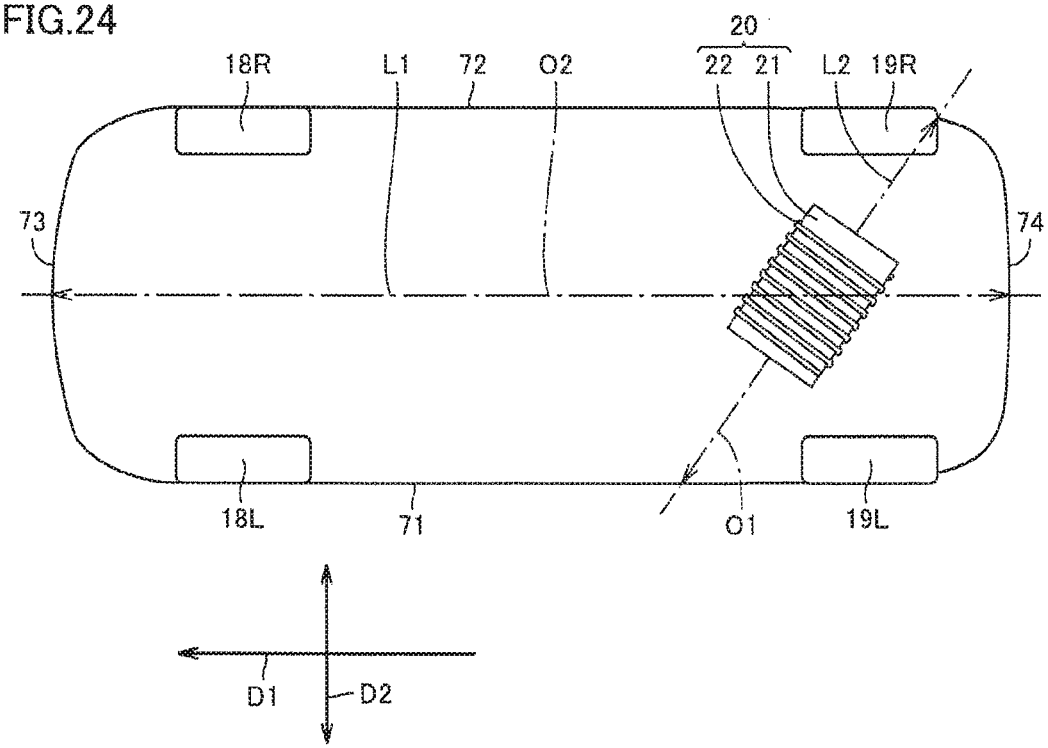
FIG. 24 is a plan view schematically showing the second modification of electrically powered vehicle 10 according to the present first embodiment.

FIG. 24 is a plan view schematically showing the second modification of electrically powered vehicle 10 according to the present first embodiment. In the example shown in this FIG. 24, second coil 22 is disposed such that winding axis O1 intersects width direction D2. Also in this example, when bottom surface 76 and winding axis O1 are viewed in plan from above electrically powered vehicle 10, length L2 of winding axis O1 located to fall within bottom surface 76 is shorter than length L1 of electrically powered vehicle 10 in the front-rear direction.

Accordingly, an electromagnetic field having high strength is suppressed from being distributed over a relatively wide range below bottom surface 76. As a result of this, an electromagnetic field having high strength can be suppressed from reaching the in-vehicle devices.

Second Embodiment

Figure 25:
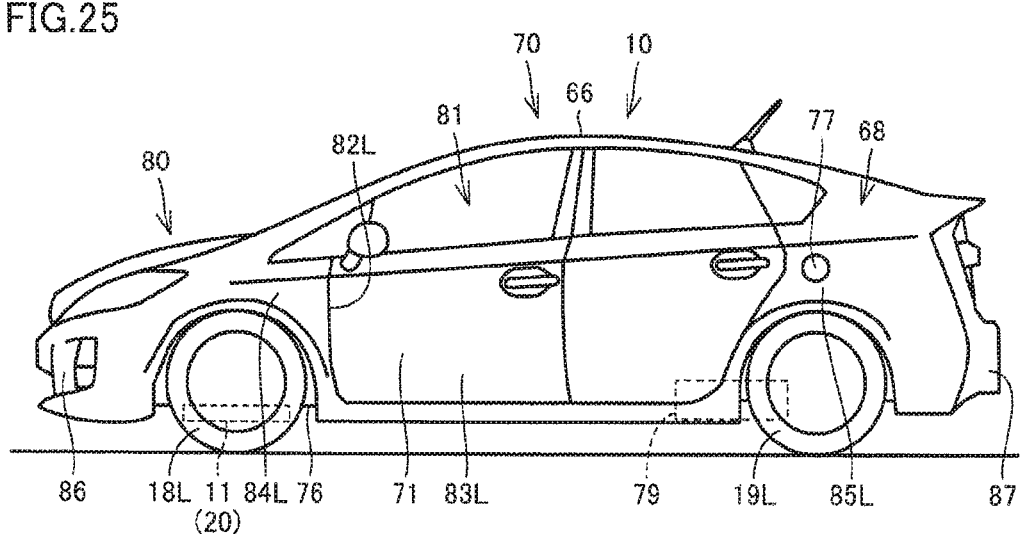
FIG. 25 is a left side view of electrically powered vehicle 10 according to the second embodiment.
Figure 26:
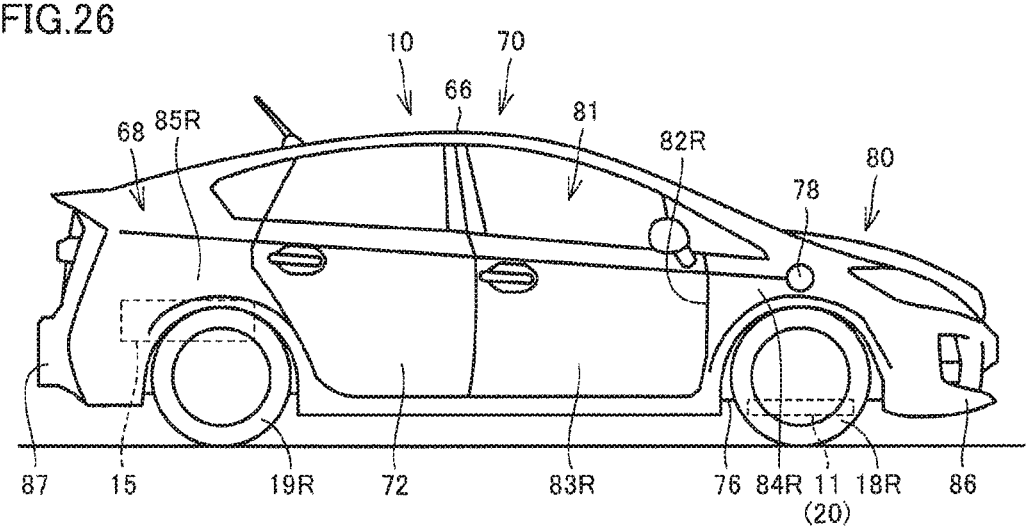
FIG. 26 is a right side view of electrically powered vehicle 10.
Figure 27:
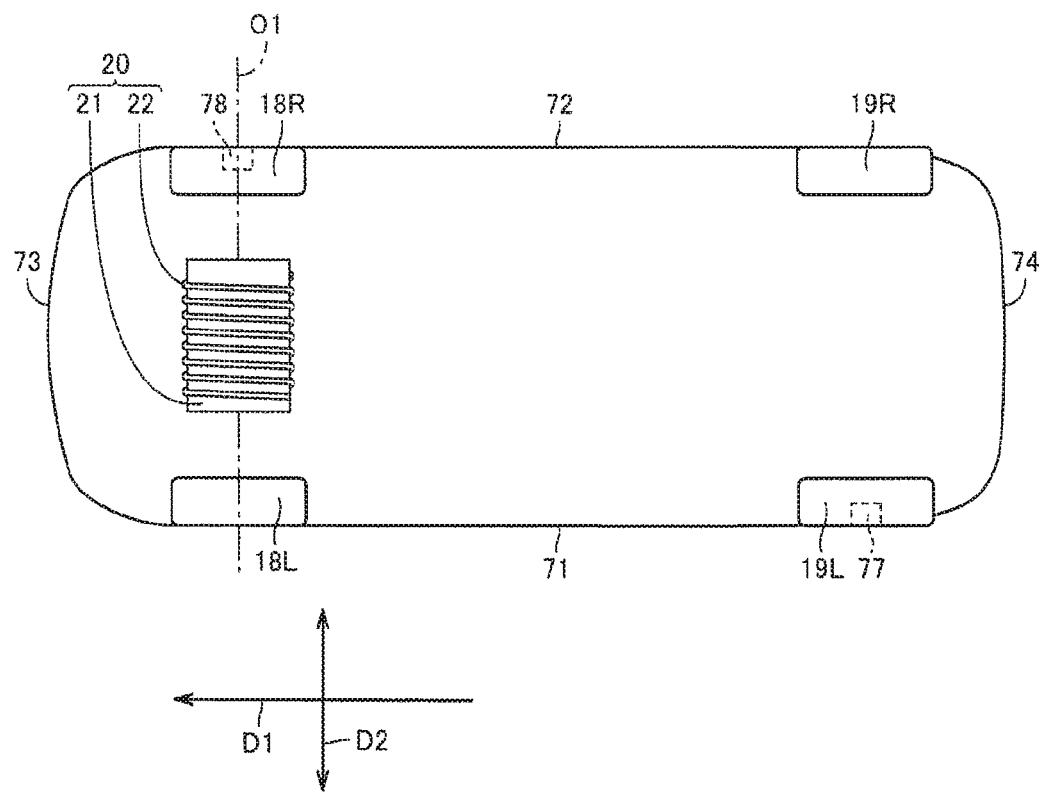
FIG. 27 is a plan view schematically showing electrically powered vehicle 10.

With reference to FIG. 25 to FIG. 27, the following describes an electrically powered vehicle 10 according to the present second embodiment. It is to be noted that those of the configurations shown in FIG. 25 to FIG. 27 that are identical or correspond to the configurations shown in FIG. 1 to FIG. 24 are designated by the same reference characters, and description thereof may not be repeated. FIG. 25 is a left side view of electrically powered vehicle 10 according to the present second embodiment. FIG. 26 is a right side view of electrically powered vehicle 10. FIG. 27 is a plan view schematically showing electrically powered vehicle 10.

As shown in FIGS. 25 and 26, power reception unit 20 is provided in a portion of bottom surface 76 that is located below driving compartment 80. As shown in FIG. 26, power reception unit 20 is disposed between front wheel 18R and front wheel 18L, and second coil 22 is disposed such that winding axis O1 passes through front wheel 18R and front wheel 18L. Accordingly, also in electrically powered vehicle 10 according to the present second embodiment, an electromagnetic field having high strength is suppressed from leaking to an area around electrically powered vehicle 10.

As shown in FIG. 26, charging portion 78 is provided at the front side relative to door 83R. Charging portion 78 is provided in a portion of right side surface 72 that is located above rear wheel 19R. Accordingly, an electromagnetic field having high strength can be suppressed from reaching charging portion 78.

Refueling portion 77 is disposed in a portion of left side surface 71 at the rear side relative to door 83L. Power reception unit 20 is disposed at the front side relative to door 83L while door 83L is disposed between refueling portion 77 and power reception unit 20. Accordingly, the distance between refueling portion 77 and power reception unit 20 is relatively long, so that an electromagnetic field having high strength is suppressed from reaching refueling portion 77.

In addition, also in the present second embodiment, the length of winding axis O1 located to fall within bottom surface 76 is shorter than the length of electrically powered vehicle 10 in the front-rear direction. Accordingly, an electromagnetic field having high strength can be suppressed from being formed over a wide range below bottom surface 76.

Third Embodiment

With reference to FIGS. 28 to 31, electrically powered vehicle 10 according to the present third embodiment will be hereinafter described. It is to be noted that those of the configurations shown in FIGS. 28 to 31 that are identical or correspond to the configurations shown in FIGS. 1 to 27 are designated by the same reference characters, and description thereof may not be repeated.

Figure 28:
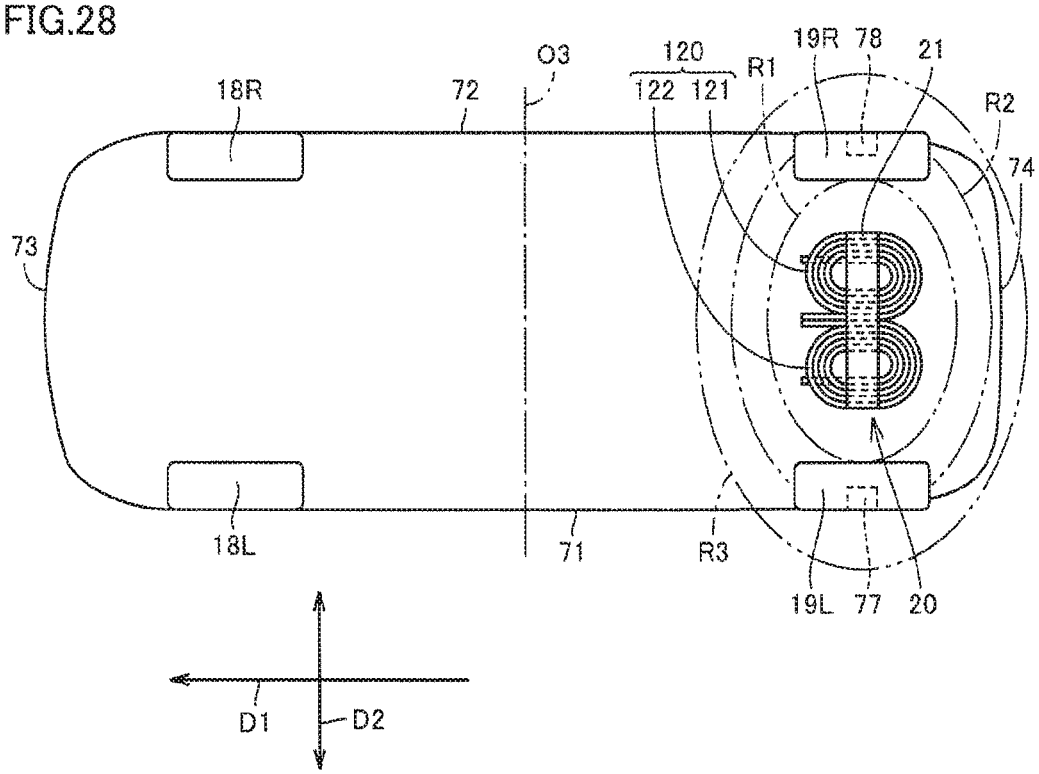
FIG. 28 is a plan view schematically showing an electrically powered vehicle 10 according to the third embodiment.

FIG. 28 is a plan view schematically showing electrically powered vehicle 10 according to the present third embodiment. As shown in this FIG. 28, power reception unit 20 is disposed between a rear wheel 19R and a rear wheel 19L.

Figure 29:
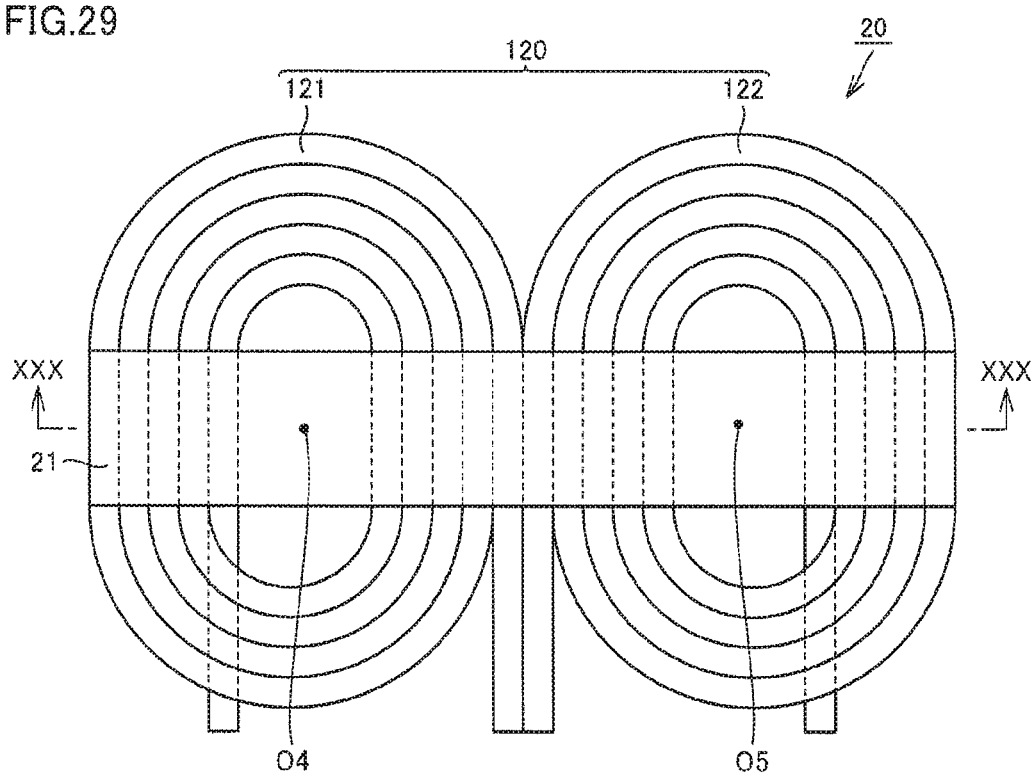
FIG. 29 is a plan view showing a power reception unit 20.
Figure 30:
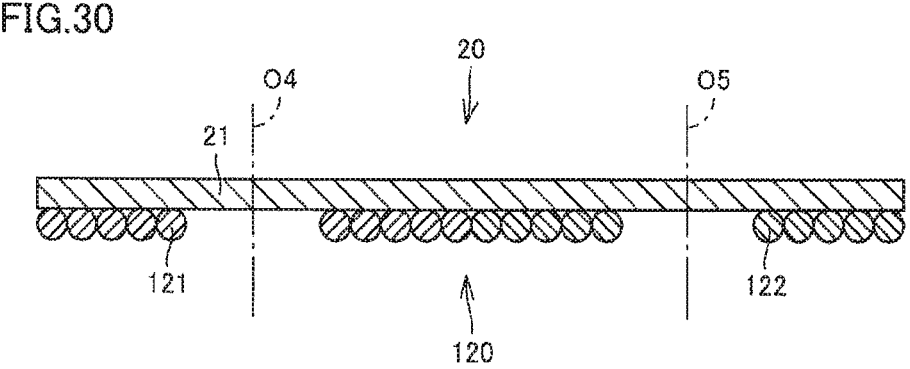
FIG. 30 is a cross sectional view taken along a XXX-XXX line shown in FIG. 29.

FIG. 29 is a plan view showing power reception unit 20. FIG. 30 is a cross sectional view taken along a XXX-XXX line shown in FIG. 29. As shown in FIG. 29 and FIG. 30, power reception unit 20 includes: a ferrite core 21; and a coil unit 120 provided on the lower surface of this ferrite core 21.

Ferrite core 21 is formed to have a rectangular shape, and is disposed to be long in width direction D2 as shown in FIG. 28.

In FIG. 29 and FIG. 30, coil unit 120 includes coils 121 and 122 arranged in the longitudinal direction of ferrite core 21.

Coil 121 is formed by winding a litz wire (coil wire) around winding axis O4 extending in the vertical direction, and the litz wire is wound in a plane extending along the lower surface of ferrite core 21.

Coil 122 is formed by winding a litz wire (coil wire) around winding axis O5 extending in the vertical direction, and the litz wire is wound in an imaginary plane passing through the lower surface of ferrite core 21.

It is to be noted that each of coil 121 and coil 122 is wound to provide a hollow and ferrite core 21 is exposed through the hollow portion of each of coil 121 and coil 122.

Figure 31:
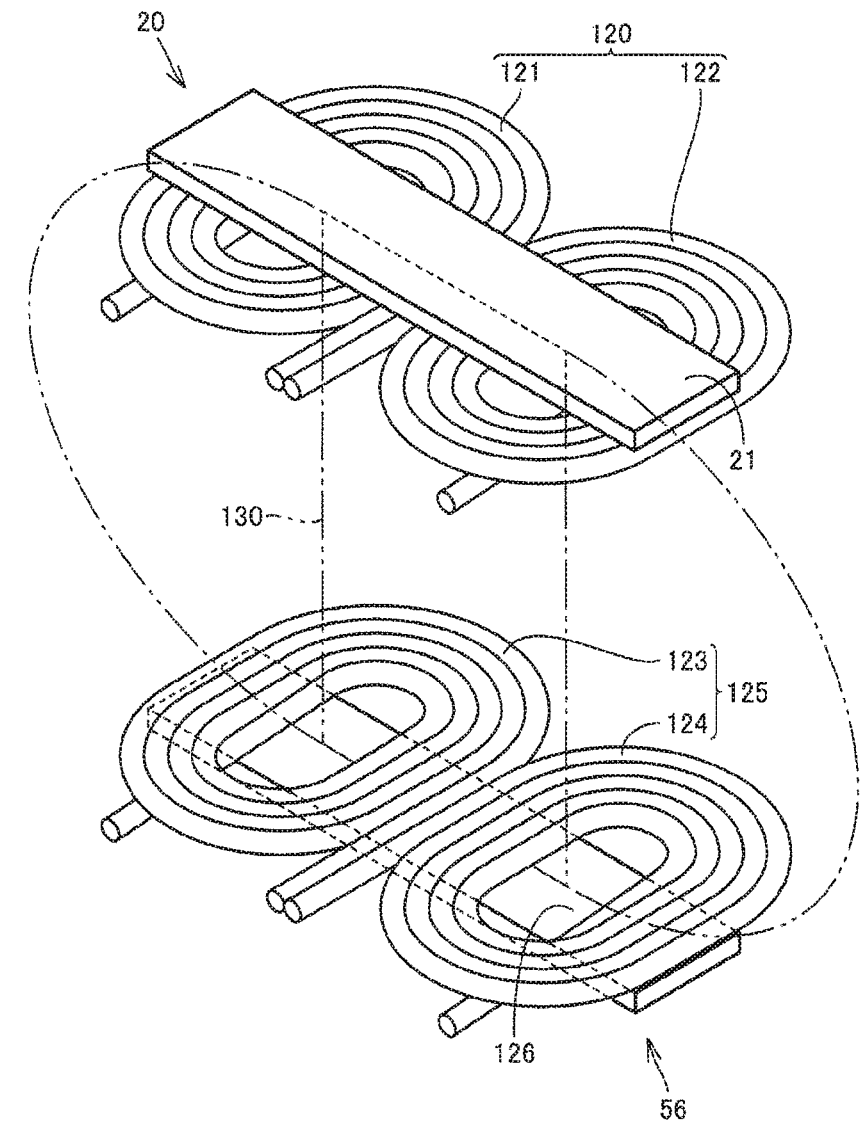
FIG. 31 is a perspective view showing power reception unit 20 and power transmission unit 56.

FIG. 31 is a perspective view showing power reception unit 20 and power transmission unit 56. As shown in this FIG. 31, power transmission unit 56 is formed in the same manner as power reception unit 20.

Power transmission unit 56 includes: a core ferrite core 126 formed to have a plate-like shape; and a coil unit 125 disposed on the upper surface of this core ferrite core 126.

Core ferrite core 126 is also formed to have a rectangular shape. Coil unit 125 includes coils 123 and 124 arranged in the longitudinal direction of core ferrite core 126.

Coil 123 is formed by winding a litz wire (coil wire) to surround the winding axis, and the litz wire is wound in a plane passing through the upper surface of core ferrite core 126. Coil 124 is formed by winding a litz wire to surround the winding axis, and this litz wire is also wound in a plane passing through the upper surface of core ferrite core 126.

Each of coil 123 and coil 124 is wound to provide a hollow and core ferrite core 126 is exposed through the hollow portion of each of coil 123 and coil 124.

When electric power is transferred between power reception unit 20 and power transmission unit 56 thus formed, a magnetic path is formed between power reception unit 20 and power transmission unit 56.

Magnetic path 130 passes through the hollow portion of coil 123, the air gap, the hollow portion of coil 121, the portion of ferrite core 21 exposed through the hollow portion of coil 121, and the portion of ferrite core 21 between coil 121 and coil 122. Further, magnetic path 130 passes through the portion of ferrite core 21 exposed through the hollow portion of coil 122, the hollow portion of coil 122, the air gap, and the hollow portion of coil 124. Further, magnetic path 130 passes through the portion of ferrite core 126 exposed through the hollow portion of coil 124, the portion of ferrite core 126 between coil 123 and coil 124, and the portion of ferrite core 126 exposed through the hollow portion of coil 123.

With magnetic path 130 being thus formed between power reception unit 20 and power transmission unit 56, power transfer efficiency is improved between power reception unit 20 and power transmission unit 56.

In FIG. 31, for example, when the magnetic flux flows from the hollow portion of coil 122 toward the hollow portion of coil 121, a part of the magnetic flux may not flow toward the hollow portion of coil 122, but may be emitted from the end of ferrite core 21 to the outside, and then, may pass through an air gap and reach the end of ferrite core 126.

Similarly, when the magnetic flux flows from the hollow portion of coil 121 toward the hollow portion of coil 122, a part of the magnetic flux does not enter into the hollow portion of coil 122, but is emitted from the end of ferrite core 21 toward the outside, and then, reaches the end of ferrite core 126.

Consequently, when electric power is transferred between power reception unit 20 and power transmission unit 56, a first strength region R1, a second strength region R2 and a third strength region R3 are distributed wider in the direction in which coil 121 and coil 122 are arranged than in the direction perpendicular to the direction in which coil 121 and coil 122 are arranged, as shown in FIG. 28.

In this case, coil 121 and coil 122 are arranged in width direction D2 as shown in FIG. 28. Accordingly, first strength region R1, second strength region R2 and third strength region R3 are distributed wider in width direction D2 than in traveling direction D1. Then, third strength region R3 extends also to the outside of electrically powered vehicle 10 and is reduced in area extending below bottom surface 76.

Accordingly, an electromagnetic field having high strength can be suppressed from reaching the in-vehicle devices mounted in electrically powered vehicle 10.

In addition, also in electrically powered vehicle 10 according to the present third embodiment, charging portion 78 is provided in a portion of right side surface 72 that is located above rear wheel 19R. Furthermore, refueling portion 77 is provided in a portion of left side surface 71 that is located above rear wheel 19L.

Fourth Embodiment

With reference to FIGS. 32 to 38, electrically powered vehicle 10 according to the present fourth embodiment will be hereinafter described. It is to be noted that those of the configurations shown in FIGS. 32 to 38 that are identical or correspond to the configurations shown in FIGS. 1 to 31 are designated by the same reference characters, and description thereof may not be repeated.

Figure 32:
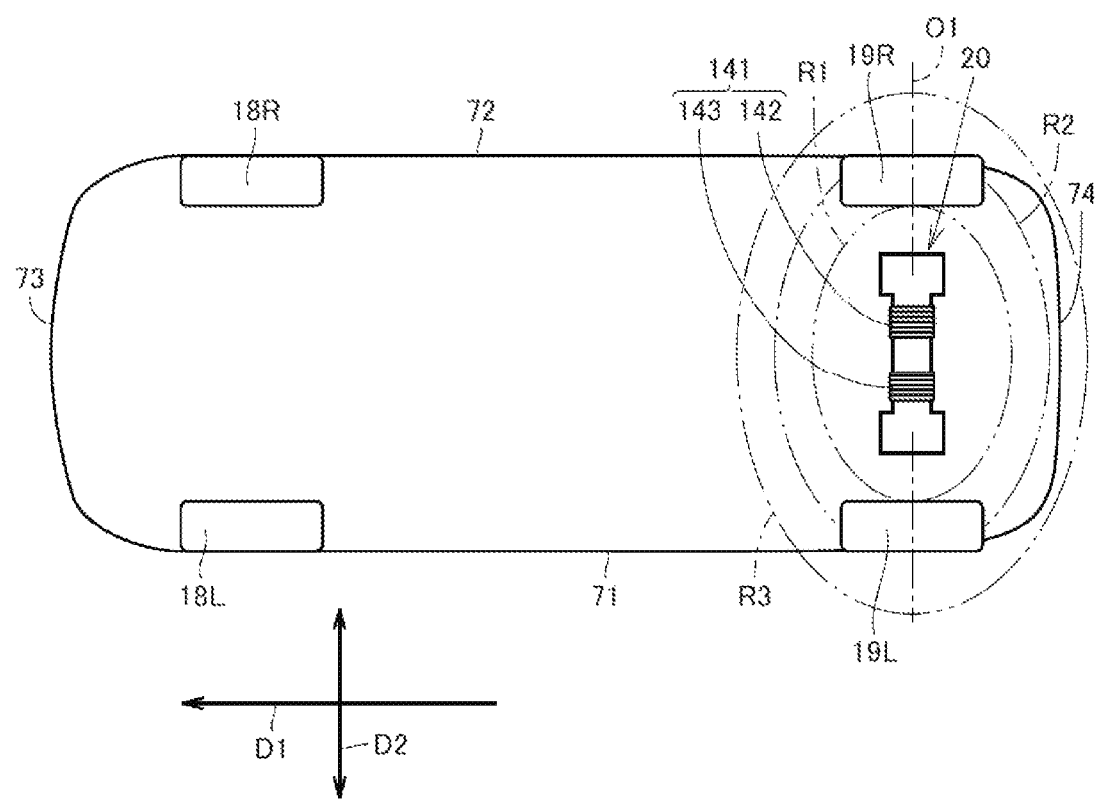
FIG. 32 is a plan view schematically showing an electrically powered vehicle 10 according to the twenty-sixth embodiment.
Figure 33:
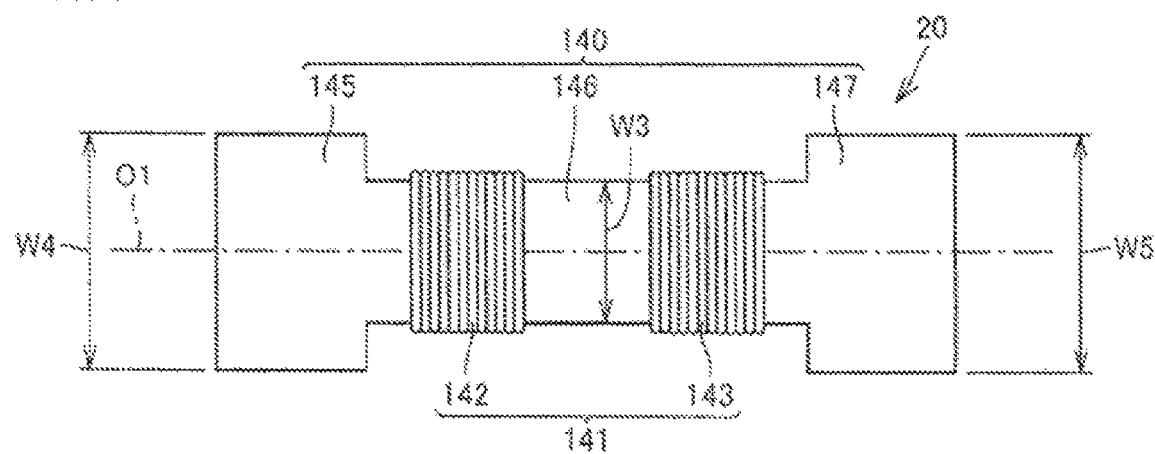
FIG. 33 is a plan view schematically showing power reception unit 20.

FIG. 32 is a plan view schematically showing electrically powered vehicle 10 according to the present twenty-sixth embodiment. FIG. 33 is a plan view schematically showing power reception unit 20. As shown in this FIG. 33, power reception unit 20 includes: a ferrite core 140; and a coil unit 141 wound around ferrite core 140.

Ferrite core 140 includes: a stem portion 146; a wide portion 145 formed at one end portion of stem portion 146; and a wide portion 147 provided at the other end portion of stem portion 146. Coil unit 141 is formed to have a plate-like shape. Width W4 of wide portion 145 and width W5 of wide portion 147 are larger than width W3 of stem portion 146.

It is to be noted that as power reception unit 20, an aluminum plate may be employed instead of ferrite core 140.

Coil unit 141 includes coils 142 and 143 wound around stem portion 146. Coil 142 and coil 143 each are formed to surround winding axis O1. Coil 142 and coil 143 are provided with a space interposed therebetween in the direction in which winding axis O1 extends. Coils 142 and 143 are provided with a space interposed therebetween in the longitudinal direction of stem portion 146.

Here, currents can be supplied to coil 142 and coil 143, respectively.

Accordingly, the direction in which the current flows through coil 142 and the direction in which the current flows through coil 143 can be separately controlled.

It is to be noted that power reception unit 20 according to the present embodiment can receive electric power not only from the same type of power transmission unit 56 but also from a different type of power transmission unit 56.

Figure 34:
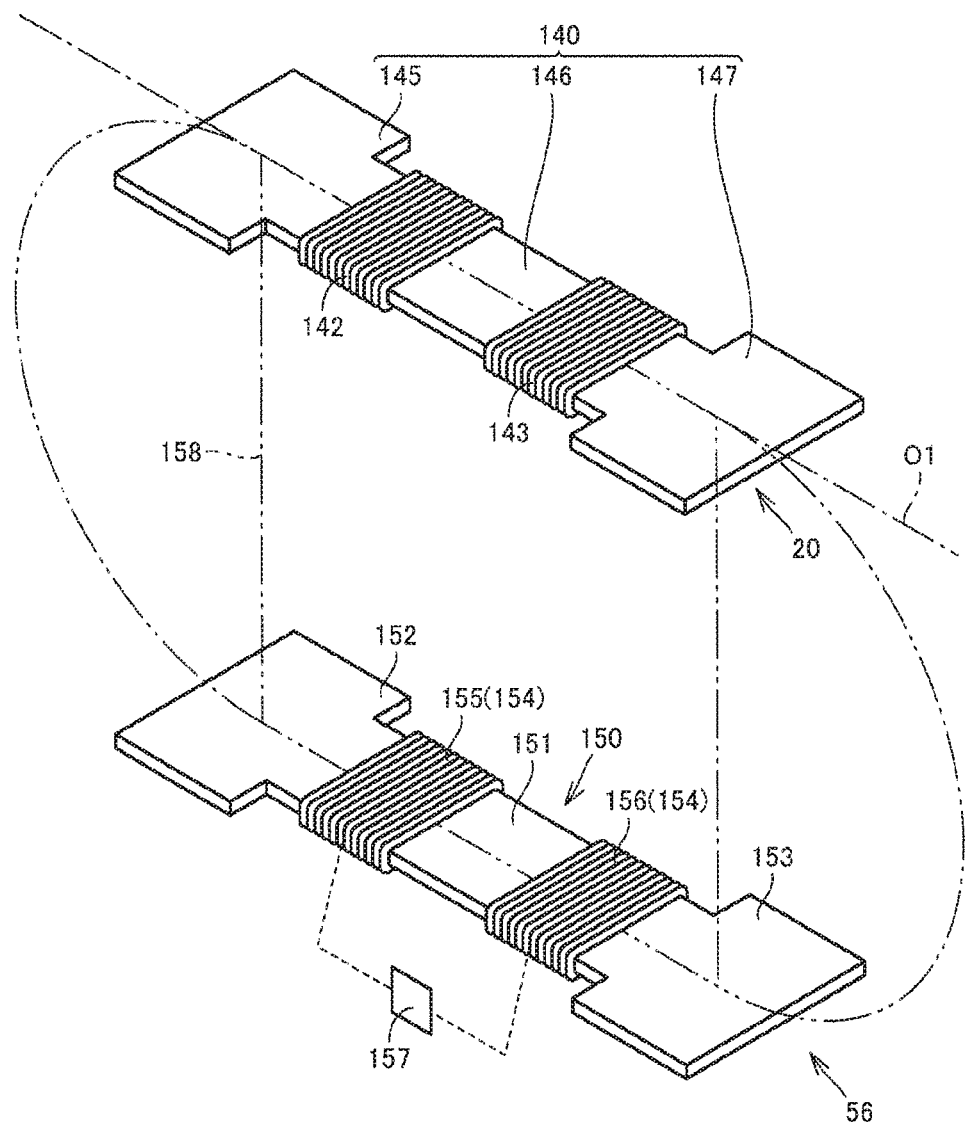
FIG. 34 is a perspective view schematically showing power reception unit 20 and power transmission unit 56.

Now, with reference to FIG. 34, the following first describes a case where electric power is received from the same type of power transmission unit 56 as power reception unit 20.

FIG. 34 is a perspective view schematically showing power reception unit 20 and power transmission unit 56. As shown in FIG. 34, power transmission unit 56 includes: a ferrite core 150; a coil unit 154 provided on ferrite core 150; and a control unit 157.

Ferrite core 150 includes: a stem portion 151; a wide portion 152 provided at one end portion of stem portion 151; and a wide portion 153 provided at the other end portion of stem portion 151. It is to be noted that the widths of wide portion 152 and wide portion 153 are larger than the width of stem portion 151.

It is to be noted that in power transmission unit 56, an aluminum plate may be employed instead of ferrite core 150.

Coil unit 154 includes: a coil 155 provided on stem portion 151; and a coil 156 provided on stem portion 151 with a space interposed between coil 156 and coil 155.

Here, the direction in which the current flows through coil 155 and the direction in which the current flows through coil 156 can be separately controlled.

Control unit 157 can switch (control) the distribution direction of the current flowing through coil 155 and also can switch (control) the distribution direction of the current flowing through coil 156.

The following describes transfer of electric power between power reception unit 20 and power transmission unit 56 thus formed. Here, in FIG. 34, currents are caused to flow through coil 155 and coil 156 in the same direction. Accordingly, a magnetic path 158 is formed. Magnetic path 158 passes through wide portion 152, the inside of coil 155, stem portion 151, the inside of coil 156, wide portion 153, the air gap, wide portion 147, coil 143, stem portion 146, coil 142, wide portion 145, and the air gap. Accordingly, currents flow through coil 142 and coil 143. In this way, power reception unit 20 can receive electric power from the same type of power transmission unit 56 as power reception unit 20.

In this case, the magnetic flux flowing between wide portion 145 and wide portion 152 spreads to some extent. Similarly, the magnetic flux flowing between wide portion 147 and wide portion 153 also spreads to some extent. Accordingly, during transfer of electric power, the electromagnetic field is distributed widely in the direction in which winding axis O1 extends.

Figure 35:
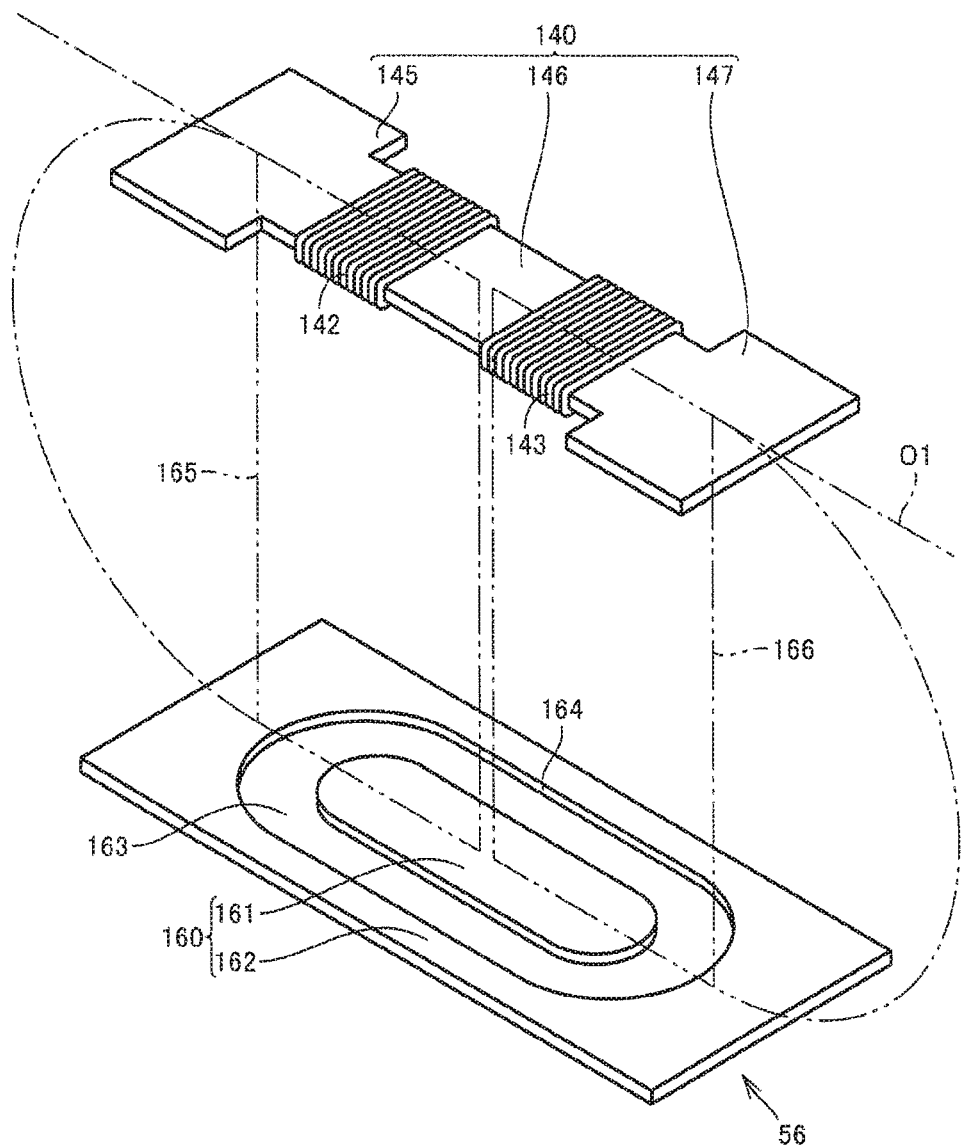
FIG. 35 is a perspective view schematically showing power reception unit 20 and power transmission unit 56.

With reference to FIG. 35, the following describes a mechanism in which power reception unit 20 receives electric power from power transmission unit 56 of a type different from power reception unit 20.

In FIG. 35, power transmission unit 56 includes a ferrite core 160 and a coil 163 provided in ferrite core 160.

Ferrite core 160 includes: a base portion 162 having a plate-like shape and having a groove portion 164 formed at its central portion; and a stem portion 161 formed in groove portion 164. Coil 163 is disposed in groove portion 164 to surround stem portion 161.

The following describes a mechanism of transferring electric power between power reception unit 20 and power transmission unit 56 thus formed.

Here, when current flows through coil 163, magnetic path 165 and magnetic path 166 are formed. Magnetic path 165 passes through, for example, stem portion 161, the air gap, stem portion 146, the inside of coil 142, wide portion 145, the air gap, and base portion 162.

Magnetic path 166 passes through stem portion 161, the air gap, stem portion 146, the inside of coil 143, wide portion 147, the air gap, and base portion 162.

Then, currents flow into coil 142 and coil 143. On this occasion, the direction in which the current flows through coil 143 is opposite to the direction in which the current flows through coil 142. In this way, power reception unit 20 receives electric power from power transmission unit 56.

Here, when power reception unit 20 described above receives electric power, an electromagnetic field having high strength is widely distributed in the direction in which winding axis O1 of each of coil 142 and coil 143 extends.

In this way, the electromagnetic field having high strength is widely distributed in the direction in which winding axis O1 extends, in each of the cases where electric power is transferred between power reception unit 20 and power transmission unit 56 of the same type as power reception unit 20, and where electric power is transferred between power reception unit 20 and power transmission unit 56 of a type different from power reception unit 20.

In FIG. 32, coil unit 141 is disposed such that winding axis O1 extends in width direction D2. Consequently, first strength region R1, second strength region R2 and third strength region R3 are distributed wider in width direction D2 than in traveling direction D1. Also, a part of third strength region R3 extends to the outside of bottom surface 76. This suppresses an increase in an area of the region in which an electromagnetic field having high strength is distributed below bottom surface 76. Then, an electromagnetic field having high strength can be suppressed from reaching the in-vehicle devices mounted in electrically powered vehicle 10.

Figure 36:
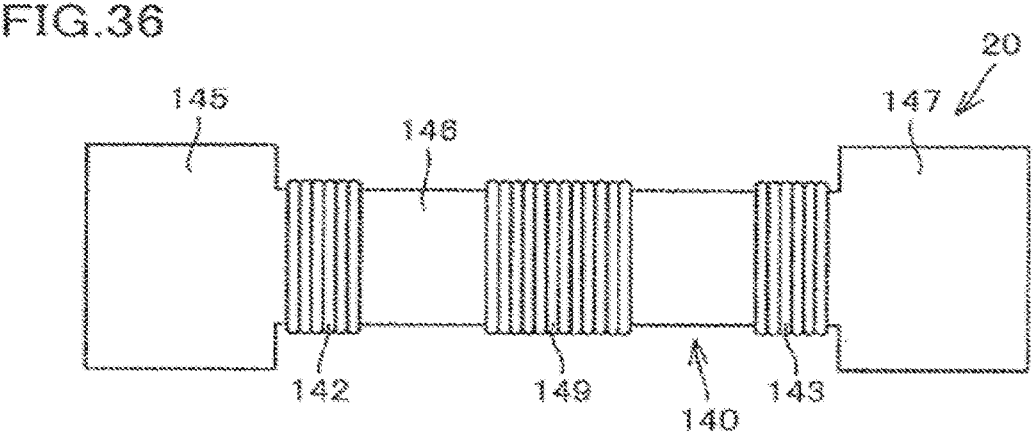
FIG. 36 is a plan view showing a modification of power reception unit 20.
Figure 37:
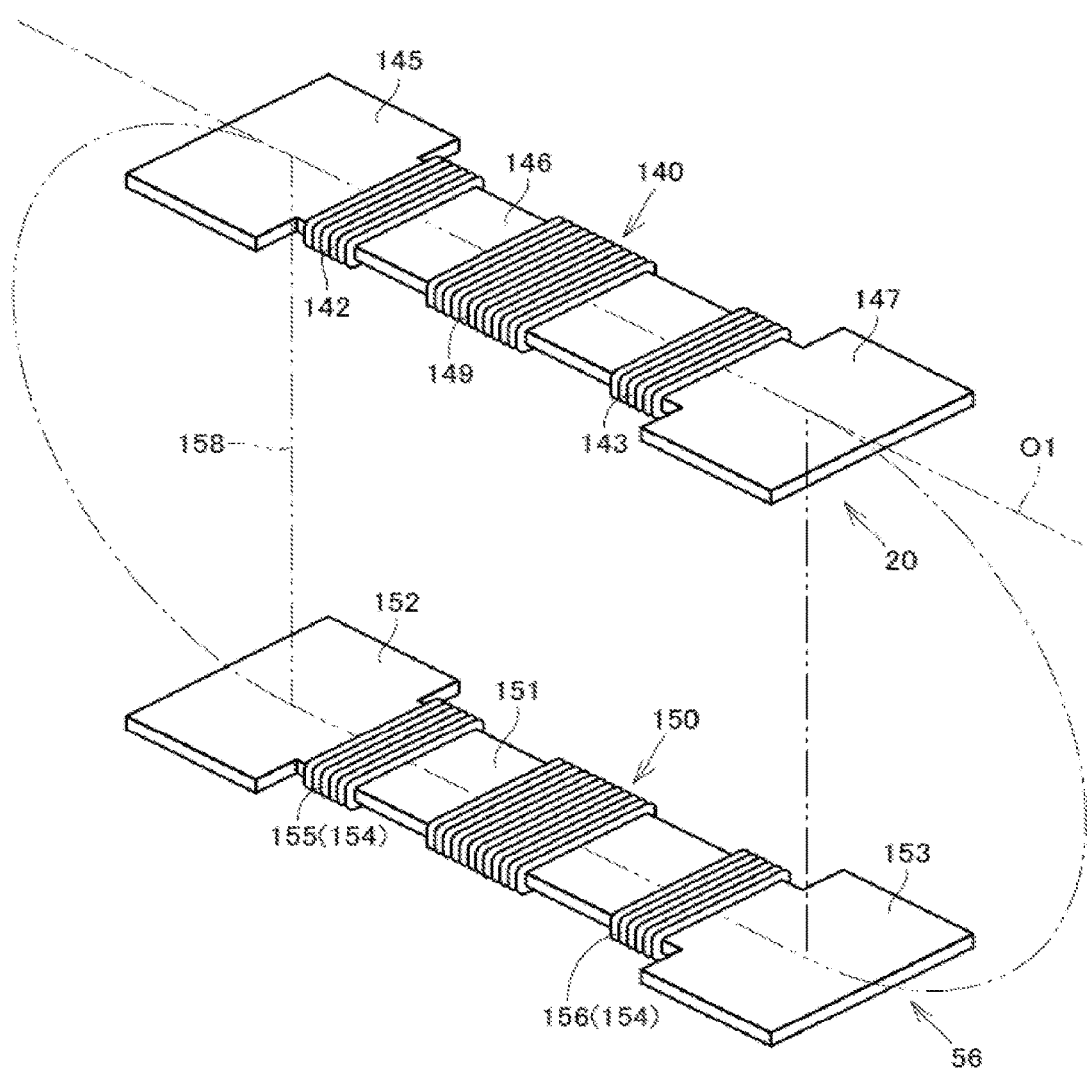
FIG. 37 is a perspective view showing that electric power is being transferred between power reception unit 20 shown in FIG. 36 and power transmission unit 56 of the same type as power reception unit 20.

It is to be noted that FIG. 36 is a plan view showing a modification of power reception unit 20. As shown in FIG. 36, power reception unit 20 further includes a middle coil 149 provided between coil 142 and coil 143. Also in the example shown in FIG. 36, electric power can be received from various types of power transmission units 56. It is to be noted that FIG. 37 is a perspective view showing that electric power is being transferred between power reception unit 20 shown in FIG. 36 and power transmission unit 56 of the same type as this power reception unit 20. As shown in this FIG. 37, the electromagnetic field is widely distributed in the direction in which winding axis O1 extends.

Figure 38:
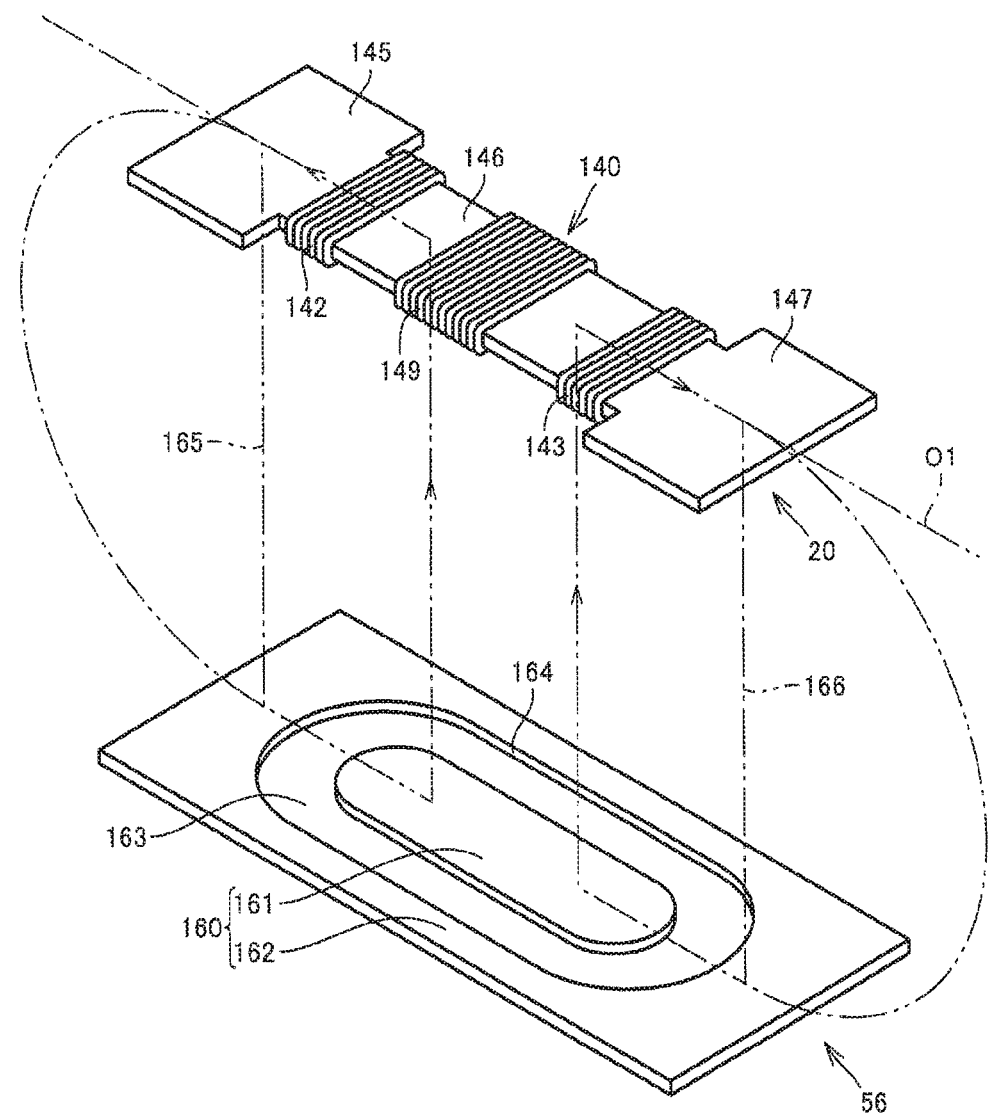
FIG. 38 is a perspective view showing that electric power is being transferred between power reception unit 20 shown in FIG. 36 and power transmission unit 56 of a type different from power reception unit 20.

FIG. 38 is a perspective view showing that electric power is being transferred between power reception unit 20 shown in FIG. 36 and power transmission unit 56 of a type different from this power reception unit 20. Also in the example shown in this FIG. 38, the electromagnetic field during transfer of electric power is widely distributed in the direction in which winding axis O1 extends.

Thus, power reception unit 20 shown in FIG. 36 also can receive electric power from various types of power transmission units 56. In this way, first strength region R1, second strength region R2 and third strength region R3 are widely distributed in the direction in which winding axis O1 extends, in each of the cases where electric power is transferred between power reception unit 20 and power transmission unit 56 of the same type as power reception unit 20, and also where electric power is transferred between power reception unit 20 and power transmission unit 56 of a type different from power reception unit 20.

Accordingly, as shown in FIG. 32, winding axis O1 is disposed to extend in width direction D2, so that an electromagnetic field having high strength can be suppressed from being distributed over a wide range below bottom surface 76. Consequently, an electromagnetic field having high strength can be suppressed from reaching the in-vehicle devices mounted in electrically powered vehicle 10.

Fifth Embodiment

With reference to FIG. 39 to FIG. 43, the following describes an electrically powered vehicle 10 according to the twenty-seventh embodiment. It is to be noted that those of the configurations shown in FIG. 39 to FIG. 43 that are identical or correspond to the configurations shown in FIG. 1 to FIG. 38 are designated by the same reference characters, and description thereof may not be repeated.

Figure 39:
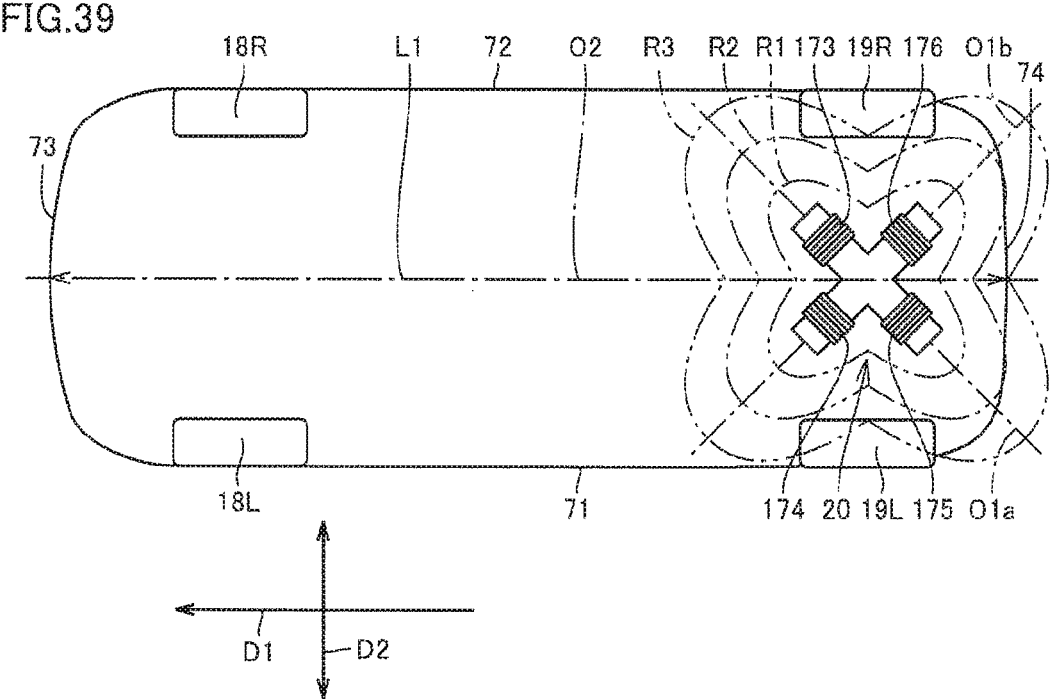
FIG. 39 is a plan view schematically showing an electrically powered vehicle 10 according to the twenty-seventh embodiment.

FIG. 39 is a plan view schematically showing electrically powered vehicle 10 according to the present twenty-seventh embodiment. As shown in this FIG. 39, power reception unit 20 is disposed between rear wheel 19L and rear wheel 19R.

Figure 40:
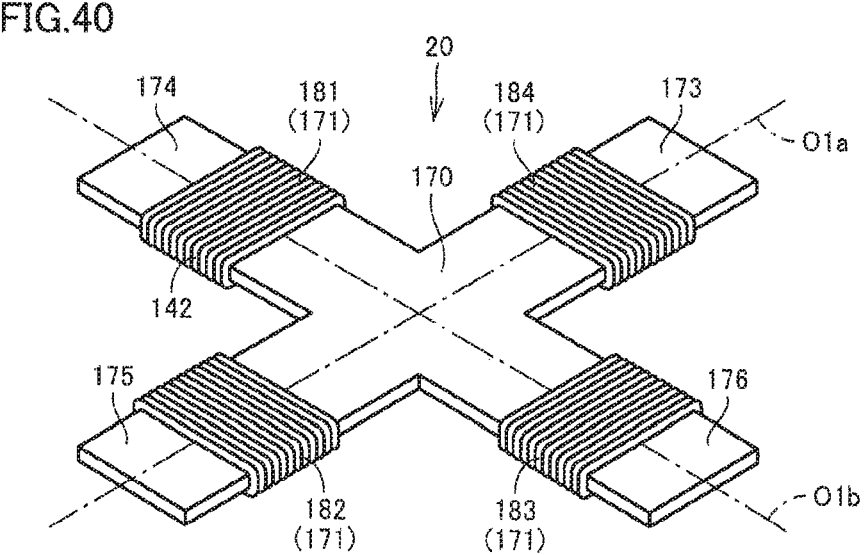
FIG. 40 is a perspective view showing power reception unit 20.

As shown in FIG. 40, power reception unit 20 includes: a ferrite core 170; and a coil unit 171 provided on ferrite core 170.

Ferrite core 170 includes a plurality of core pieces 173, 174, 175, and 176. Core pieces 173, 174, 175, and 176 each have one end connected to one another.

Coil unit 171 includes: a coil 184 wound around core piece 173; a coil 181 wound around core piece 174; a coil 182 wound around core piece 175; and a coil 183 wound around core piece 176. Accordingly, ferrite core 170 has a shape of cross. It is to be noted that ferrite core 170 is formed to have a plate-like shape.

Coil 181 and coil 183 are formed to surround a winding axis O1b, and disposed at a distance from each other in the direction in which winding axis O1b extends.

Coil 182 and coil 184 are formed to surround winding axis O1a, and disposed at a distance from each other in the direction in which winding axis O1a extends.

FIG. 39 shows winding axis O1a, winding axis O1b and bottom surface 76 that are viewed in plan from above electrically powered vehicle 10. The length of winding axis O1a located to fall within bottom surface 76 and the length of winding axis O1b located to fall within bottom surface 76 each are shorter than length L1 of electrically powered vehicle 10 in the front-rear direction.

In the present embodiment, the total of the length of winding axis O1a located to fall within bottom surface 76 and the length of winding axis O1b located to fall within bottom surface 76 is shorter than length L1 of electrically powered vehicle 10 in the front-rear direction.

Figure 41:
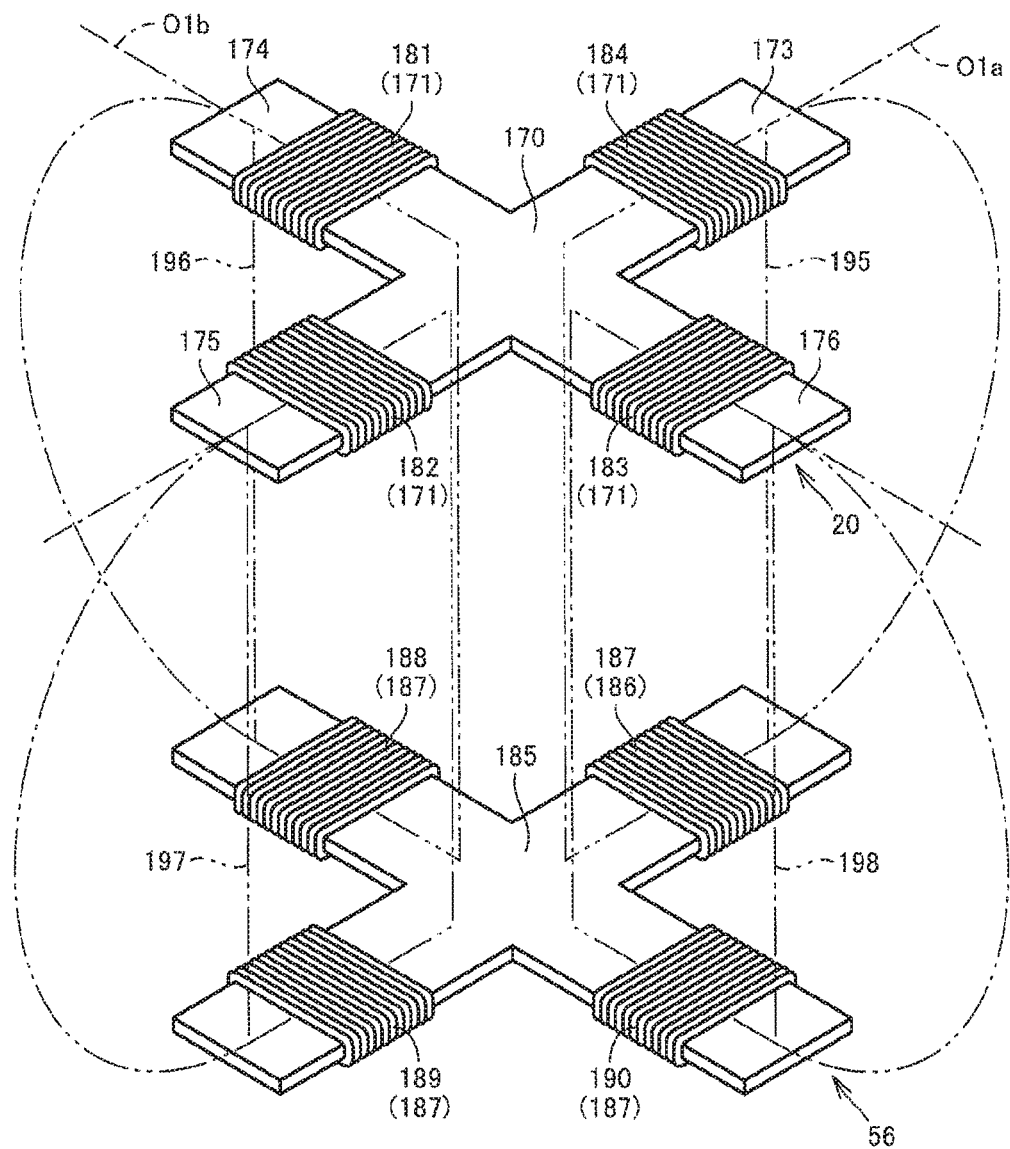
FIG. 41 is a perspective view showing that electric power is being transferred between power reception unit 20 shown in FIG. 40 and power reception unit 20 of the same type as this power reception unit 20.

Power reception unit 20 thus formed can also cope with various types of power transmission units. FIG. 41 is a perspective view showing that electric power is being transferred between power reception unit 20 shown in FIG. 40 and power reception unit 20 of the same type as this power reception unit 20. As shown in FIG. 41, power transmission unit 56 includes: a ferrite core 185 having a shape of cross; and a coil unit 186 provided on this ferrite core 185.

Ferrite core 185 includes a plurality of core piece portions. Coil unit 186 includes coils 187, 188, 189, and 190 respectively wound around the core pieces.

When transferring electric power between power transmission unit 56 and power reception unit 20 thus formed, current flows through coils 187, 188, 189, and 190 of power transmission unit 56. Accordingly, for example, in the example shown in FIG. 41, a magnetic path 195 is formed between coil 184 and coil 187. A magnetic path 196 is formed between coil 181 and coil 188. A magnetic path 197 is formed between coil 182 and coil 189. A magnetic path 198 is formed between coil 183 and coil 190.

Thus, the plurality of magnetic paths are formed between power reception unit 20 and power transmission unit 56, whereby power reception unit 20 receives electric power from power transmission unit 56. In this way, during transfer of electric power between power reception unit 20 and power transmission unit 56, the magnetic flux expands between core piece 173 and ferrite core 185 in the direction in which winding axis O1a extends. The magnetic flux expands between core piece 175 and ferrite core 185 in the direction in which winding axis O1a extends. Furthermore, between core piece 174 and ferrite core 185, and between core piece 176 and ferrite core 185, the magnetic flux expands in the direction in which winding axis O1b extends.

Consequently, as shown in FIG. 39, first strength region R1, second strength region R2 and third strength region R3 each are widely distributed in the direction in which winding axis O1a and winding axis O1b extend. In this case, the length of winding axis O1a located to fall within bottom surface 76 is relatively short, and the length of winding axis O1b located to fall within bottom surface 76 is relatively short.

Accordingly, an electromagnetic field having high strength is suppressed from spreading over a wide range below bottom surface 76, and an electromagnetic field having high strength is suppressed from reaching the in-vehicle devices mounted in electrically powered vehicle 10. Then, referring to FIG. 42, the following describes transfer of electric power between power reception unit 20 and power transmission unit 56 of a type different from this power reception unit 20.

Figure 42:
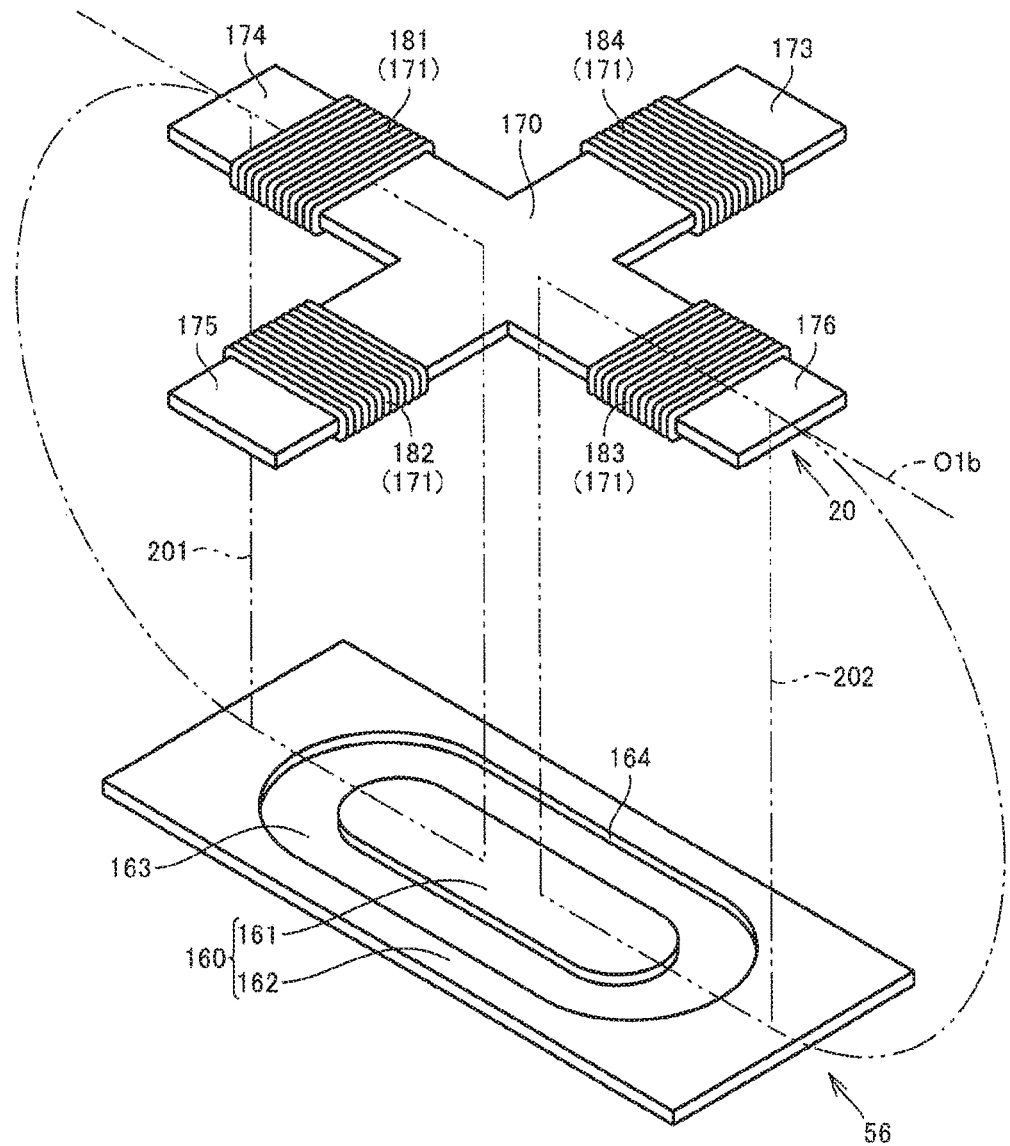
FIG. 42 is a perspective view showing that electric power is being transferred between power reception unit 20 and power transmission unit 56.

FIG. 42 is a perspective view showing the transfer of electric power between power reception unit 20 and power transmission unit 56. In FIG. 42, power transmission unit 56 includes a ferrite core 160 and a coil 163.

Base portion 162 is formed to have a plate-like shape and includes: a groove portion 164; and a stem portion 161 formed to project upwardly from the central portion of groove portion 164. Coil 163 is wound around stem portion 161.

When transferring electric power between power transmission unit 56 and power reception unit 20 thus formed, current flows through coil 163 of power transmission unit 56.

Accordingly, magnetic paths 201, 202 are formed between power reception unit 20 and power transmission unit 56. For example, magnetic path 202 passes through stem portion 161, the air gap, the central portion of ferrite core 170, the inside of coil 181, the end portion of core piece 174, the air gap, and ferrite core 160. Magnetic path 202 passes through stem portion 161, the air gap, the central portion of ferrite core 170, the inside of coil 183, core piece 176, the air gap, and ferrite core 160.

With the magnetic paths thus formed between power reception unit 20 and power transmission unit 56, large currents flow through coil 181 and coil 183. Accordingly, power reception unit 20 receives electric power from power transmission unit 56.

In this case, between core piece 174 and ferrite core 160, the magnetic flux is distributed widely in the direction in which winding axis O1b extends. Similarly, also between core piece 176 and ferrite core 160, the magnetic flux is distributed widely in the direction in which winding axis O1b extends.

Thus, according to power reception unit 20 provided in electrically powered vehicle 10 according to the present embodiment, electric power can be received from various types of power transmission units 56.

Figure 43:
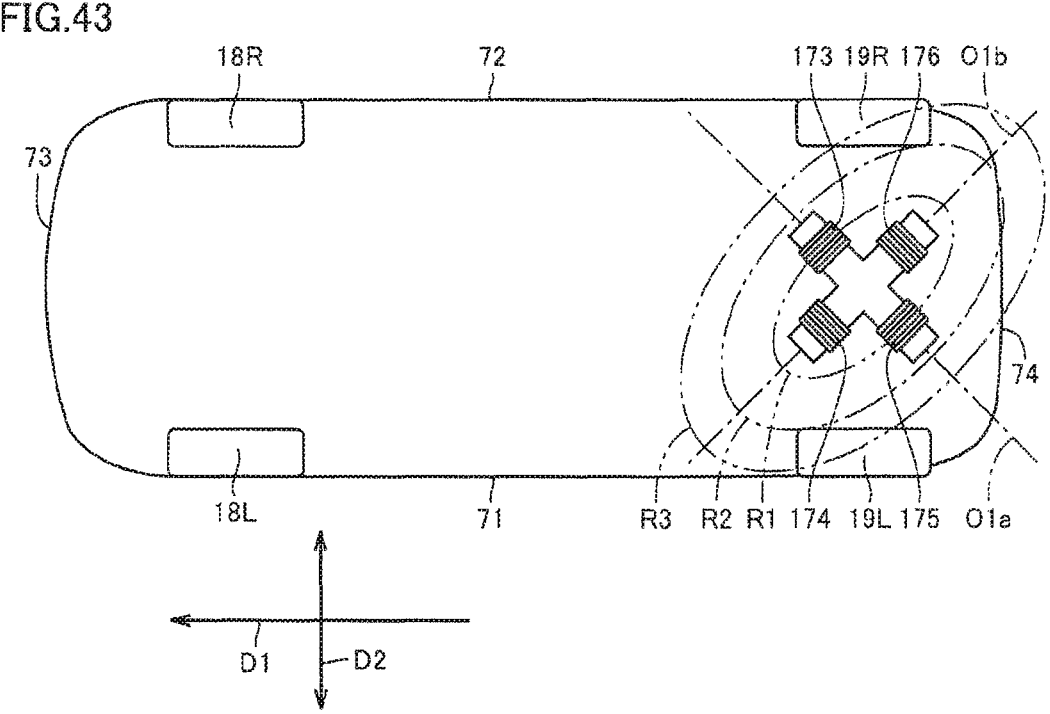
FIG. 43 is a plan view schematically showing electrically powered vehicle 10 according to the twenty-seventh embodiment.

As shown in FIG. 43, first strength region R1, second strength region R2 and third strength region R3 are distributed widely in the direction in which winding axis O1b extends. The length of winding axis O1b located to fall within bottom surface 76 is relatively short. Accordingly, an electromagnetic field having high strength can be suppressed from spreading over a wide range below bottom surface 76. Consequently, an electromagnetic field having high strength can be suppressed from reaching the in-vehicle devices mounted in electrically powered vehicle 10. In the above-described embodiments, it has been illustrated that the so-called electromagnetic field resonance coupling or the like is employed, but the present invention can be also applied to a so-called electromagnetic induction type contactless charging method. Furthermore, primary coil 58 may be provided with an electromagnetic induction coil through which electric power is transferred by means of electromagnetic induction, or an electromagnetic induction coil through which electric power is received from secondary coil 22 by means of electromagnetic induction.

The embodiments disclosed herein are illustrative and non-restrictive in any respect. The scope of the present invention is defined by the terms of the claims, and is intended to include any modifications within the meaning and scope equivalent to the terms of the claims. Further, the above-described numerical values and the like are exemplary and the present invention is not limited to the numerical values and ranges.

INDUSTRIAL APPLICABILITY

The present invention can be applied to a vehicle.

REFERENCE SIGNS LIST

10: electrically powered vehicle; 11, 91: power reception device; 13: rectifier; 14: converter; 15: battery; 16: power control unit; 17: motor unit; 18L, 18R: front wheel; 19L, 19R: rear wheel; 20, 96: power reception unit; 21, 57, 126, 140, 150, 160, 170, 185: ferrite core; 22, 58, 92, 94, 97, 99, 121, 122, 123, 124, 142, 143, 155, 156, 163, 181, 182, 183, 184, 187, 188, 189, 190: coil; 23, 59, 95, 98: capacitor; 24, 60: case; 25, 62: shield; 25a: top plate portion; 25b: circumferential wall portion; 26: cover portion; 27, 61: fixation member; 28: bolt; 29a, 29b, 64a, 64b: protrusion portion; 30, 31: insulation piece; 164: groove portion; 35: first end portion; 36: second end portion; 37, 75: upper surface; 38, 76: bottom surface; 39, 40: side surface; 41, 42: end surface; 43, 45: long side portion; 44, 46: short side portion; 47: side member; 49: floor panel; 50, 90: power transmission device; 51: external power feeding device; 52: parking space; 53: AC power supply; 54: high-frequency power driver; 55, 157: control unit; 56: power transmission unit; 56: type power transmission unit; 63: cover member; 65, 130, 158, 165, 166, 195, 196, 197, 198, 201, 202, 202: magnetic path; 66: roof; 67: hatch; 67a: upper surface portion; 67b: rear surface portion; 68: luggage compartment; 70: vehicle main body; 71: left side surface; 72: right side surface; 73: front surface; 74: rear surface; 77: refueling portion; 78: charging portion; 79: fuel tank; 80: driving compartment; 81: passenger compartment; 82L, 82R: boarding opening; 83L, 83R: door; 84L, 84R: front fender; 85L, 85R: rear fender; 86: front bumper; 87: rear bumper; 88: engine roof; 120, 125, 141, 154, 171, 186: coil unit; 126: core ferrite core; 145, 147, 152, 153: wide portion; 146, 151, 161: stem portion; 149: middle coil; 162: base portion; O1b, O1a, O1, O4, O5; winding axis.

The invention claimed is:

1. A vehicle comprising:
   a first wheel and a second wheel arranged in a width direction of the vehicle;
   a refueling portion configured to connect to an external refueling plug, wherein the refueling portion is disposed on a first side surface of the vehicle;
   a charging portion configured to connect to an external charging plug, wherein the charging portion is disposed on a second side surface of the vehicle, wherein the first side surface and the second side surface are surfaces that are viewable from a position outside of the vehicle,
   wherein the refueling portion and the charging portion are located only at a rear side relative to a center of said vehicle in a front-rear direction of the vehicle; and
   a first coil and a second coil each receiving electric power contactlessly from a power transmission unit provided externally,
   the first coil being formed to surround a first winding axis extending in a vertical direction,
   the second coil being formed to surround a second winding axis extending in the vertical direction,
   the first coil and the second coil being formed such that a current direction in a winding direction of the first coil and a current direction in a winding direction of the second coil are opposite to each other during power reception,
   an electromagnetic field being formed around the first coil and the second coil,
   wherein the first coil and the second coil are located at a front side relative to the center of said vehicle in the front-rear direction,
   wherein the first coil and the second coil are disposed between the first front wheel and the second front wheel along a virtual plane in the width direction of the vehicle, wherein the virtual plane in the width direction of the vehicle intersects the first front wheel and the second front wheel, and wherein the electromagnetic field is distributed wider in the width direction of the vehicle than in a traveling direction of the vehicle.

2. A vehicle comprising:

a first wheel and a second wheel arranged in a width direction of the vehicle;

a refueling portion configured to connected to an external refueling plug, wherein the refueling portion is disposed on a first side surface of the vehicle;

a charging portion configured to connected to an external charging plug, wherein the charging portion is disposed on a second side surface of the vehicle, wherein the first side surface and the second side surface are surfaces that are viewable from a position outside of the vehicle, wherein the refueling portion and the charging portion are located only at a rear side relative to a center of said vehicle in front-rear direction of the vehicle; and a first coil and a second coil each receiving electric power contactlessly from a power transmission unit provided externally, the first coil being formed to surround a first winding axis extending in a vertical direction, the second coil being formed to surround a second winding axis extending in the vertical direction, the first coil and the second coil being formed to be symmetric with respect to a virtual plane located between the first and the second coil, the virtual plane being parallel with a traveling direction of the vehicle, an electromagnetic field being formed around the first coil and the second coil, wherein the first coil and the second coil are located at a front side relative to the center of said vehicle in the front-rear direction, wherein the first coil and the second coil are disposed between the first front wheel and the second front wheel along another virtual plane in the width direction of the vehicle, wherein the another virtual plane in the width direction of the vehicle intersects the first front wheel and the second front wheel, and wherein the electromagnetic field is distributed wider in the width direction of the vehicle than in the traveling direction of the vehicle.

\* \* \* \* \*